(12) United States Patent
Hagano

(10) Patent No.: US 7,516,867 B2
(45) Date of Patent: Apr. 14, 2009

(54) CAP DEVICE HAVING TORQUE MECHANISM

(75) Inventor: Hiroyuki Hagano, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 738 days.

(21) Appl. No.: 10/994,531

(22) Filed: Nov. 23, 2004

(65) Prior Publication Data

US 2005/0115971 A1    Jun. 2, 2005

(30) Foreign Application Priority Data

Nov. 25, 2003  (JP)  ............................. 2003-393800
Aug. 30, 2004  (JP)  ............................. 2004-250225

(51) Int. Cl.
*B65D 53/00*  (2006.01)
*G09F 9/00*  (2006.01)

(52) U.S. Cl. ............................. 220/304; 220/DIG. 33; 116/309

(58) Field of Classification Search .......... 220/DIG. 32, 220/DIG. 33, 304, 288; 116/309, 311, 28 R
See application file for complete search history.

(56) References Cited

U.S. PATENT DOCUMENTS

| | | | |
|---|---|---|---|
| 5,924,590 A * | 7/1999 | Jocic et al. ............. | 220/203.24 |
| 6,076,695 A | 6/2000 | Palvoelgyi et al. | |
| 6,179,148 B1 * | 1/2001 | Harris ..................... | 220/288 |
| 6,745,914 B2 * | 6/2004 | Hagano et al. ........... | 220/288 |
| 6,793,091 B2 * | 9/2004 | Hagano et al. ........... | 220/304 |
| 7,290,673 B2 * | 11/2007 | Hagano .................... | 220/288 |

FOREIGN PATENT DOCUMENTS

EP    1 040 952 A3    12/2002

\* cited by examiner

*Primary Examiner*—Robin Hylton
(74) *Attorney, Agent, or Firm*—Posz Law Group, PLC

(57) ABSTRACT

A fuel cap has a cap main body, a cover with a handle, and a torque mechanism. The torque mechanism includes a torque transmission unit and click units. When the handle is rotated in a closing direction, torque is transmitted to a cantilever spring of the torque mechanism. The cantilever spring is deformed by rotation of the cover in the closing direction. After the spring is deformed by a predetermined amount, in response to rotation of the cover with respect to the cap main body by at least a preset angle, the click units make a click sound. When the user releases the handle, the spring force of the cantilever spring restores the click units to their initial positions. The cap device has a torque mechanism that has a simple structure and consists of a small number of parts.

19 Claims, 22 Drawing Sheets

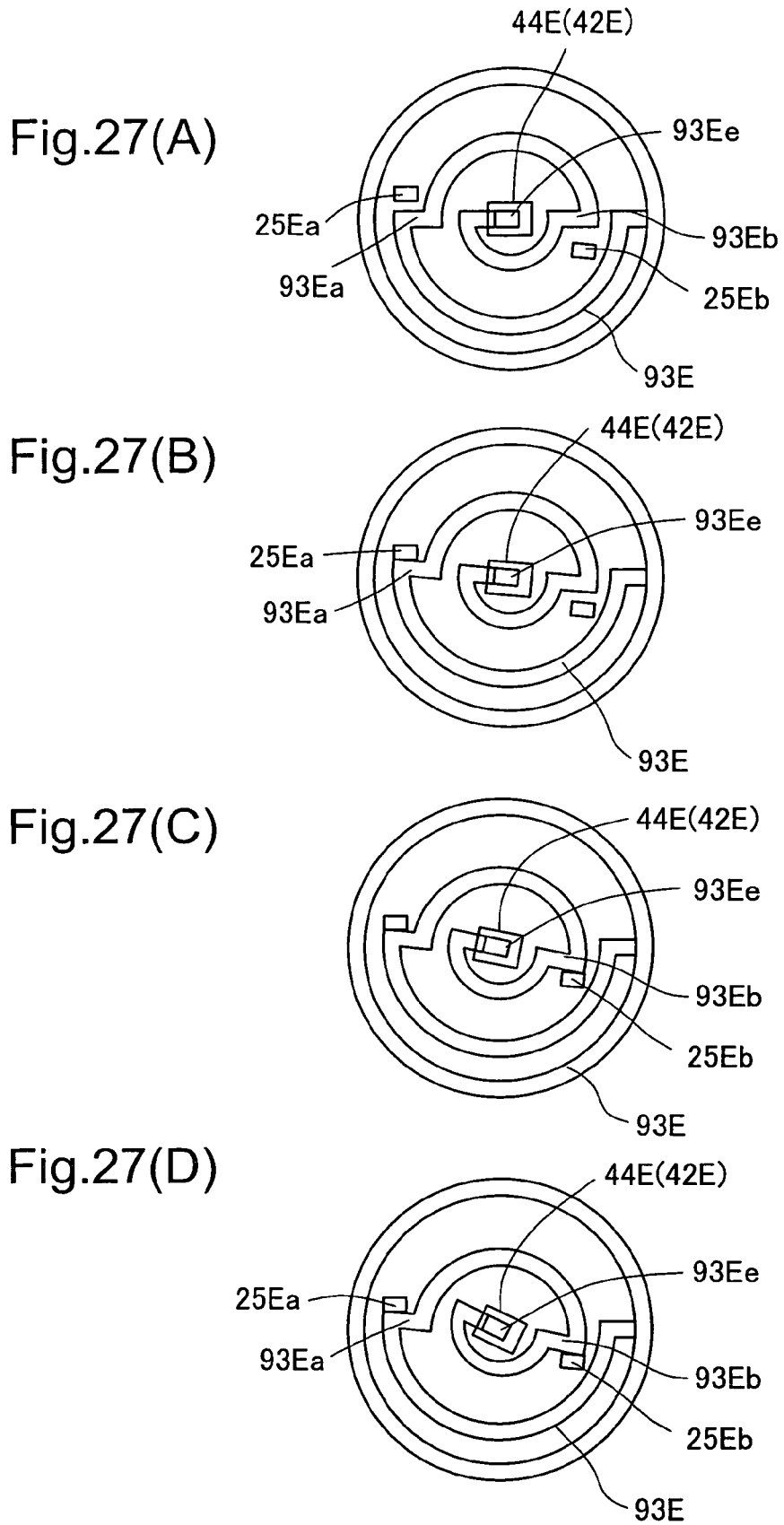

CAP DEVICE HAVING TORQUE MECHANISM

This application claims the benefit of and priority from Japanese Application No. 2003-393800 filed Nov. 25, 2003, and No. 2004-250225 filed Aug. 30, 2004, the contents of which are incorporated herein by reference.

BACKGROUND OF THE INVENTION

1. Field of the Invention

The present invention relates to a cap device having a torque mechanism for sealing a tank opening with a rotational torque of a predetermined level.

2. Description of the Related Art

One known cap device is a fuel cap for fuel tanks of automobiles (see U.S. Pat. No. 6,076,695). The fuel cap includes a closer to seal a tank opening, a cover with a handle for rotational operations, and a torque mechanism. The torque mechanism includes a coil spring that is located between the cover and the closer, and a click mechanism that includes mating engagement elements respectively formed on the cover and the closer. Coupling of the engagement elements is released to give a click sound, in response to a relative rotation of the cover to the closer by a preset angle.

When the user holds and rotates the handle of the fuel cap in a closing direction to close an inlet opening, the coil spring between the cover and the closer is compressed to transmit a rotational torque from the cover to the closer and accordingly rotate the closer in the closing direction. Coupling of the mating engagement elements of the click mechanism is released to give a click by a rotational torque of or over a preset level. This click sound enables the user to confirm that the closer is clamped with a sealing pressure of or over a preset level.

There are high demands for decreasing the total number of parts and simplifying the structure of the fuel cap.

SUMMARY OF THE INVENTION

The object of the invention is to provide a cap device including a torque mechanism that has a simple structure and consists of a less number of parts to give a click.

In order to attain at least part of the above and the other related objects, the present invention is directed to a cap device that closes a tank opening and engages with an opening engagement element formed around is periphery of the tank opening. The cap device includes: a closer that seals the tank opening and has a cap engagement element, which is engaged with the opening engagement element by rotation of the closer by a preset angle; a handle mechanism that is attached to an upper side of the closer in a rotatable manner to selectively rotate the closer in a closing direction and an opening direction to close and open the tank opening; and a torque mechanism that is provided between the handle mechanism and the closer and selectively transmits a rotational torque in the closing direction and the opening direction to the closer. The torque mechanism includes: a click unit having a first click engagement element and a second click engagement element that mates with the first click engagement element, where the first click engagement element and the second click engagement element are disengaged and shift from an initial position to a released position to give a click sound, when the handle mechanism and the closer are rotated relative to each other by the preset angle in response to an operation of the handle mechanism in the closing direction; and a torque transmission unit having a first torque engagement element and a second torque engagement element that mates with the first torque engagement element, the torque transmission unit transmitting a rotational torque in the closing direction applied to the handle mechanism to the closer via coupling of the first torque engagement element with the second torque engagement element. At least one of the first torque engagement element and the second torque engagement element is a cantilever spring that is elastically deformed by the rotation of the handle mechanism in the closing direction to transmit the rotational torque to the closer while accumulating a spring force. The cantilever spring applies the accumulated spring force to restore the click unit from the released position to the initial position when the rotational torque applied to the handle mechanism is released.

In the cap device of the invention, when the closer is set in the tank opening and the handle mechanism is rotated in the closing direction, the cap engagement element formed on the closer engages with the opening engagement element formed on the tank opening to rotate the closer via the torque mechanism. In this state, the rotational torque is transmitted from the first torque engagement element to the second torque engagement element in the torque mechanism. At least one of the first torque engagement element and the second torque engagement element is the cantilever spring that is elastically deformed by the rotation of the handle mechanism in the closing direction to transmit the rotational torque to the closer while accumulating the spring force. The click unit gives a click sound in response to a relative rotation of the handle mechanism to the closer by a preset angle. This enables the user to confirm that the closer is clamped with a rotational torque of or over a preset level. When the user releases the hold of the handle mechanism, the accumulated spring force of the cantilever spring restores the click unit to its initial position. The cap device closes the tank opening in this state.

At least one of the first torque engagement element and the second torque engagement element is structured as the cantilever spring. The cap device of the invention does not require any coil spring used in the prior art structure, thus desirably decreasing the total number of parts and simplifying the structure.

In one preferable embodiment of the cap device of the invention, the torque mechanism includes a torque plate that is located between the handle mechanism and the closer in a freely rotatable manner. The first torque engagement element is a torque transmission rib formed on the handle mechanism, and the second torque engagement element is a cantilever spring that is protruded from the torque plate in an elastically deformable manner to engage with the torque transmission rib and increase the spring force with an increase in degree of elastic deformation. The cantilever spring is engaged with the torque transmission rib by rotation of the handle mechanism to be deformed and transmit the rotational torque.

The cantilever spring may be protruded upright in a substantially vertical direction from the torque plate. When the handle mechanism includes a cover and a handle that is protruded from a top face of the cover and has a recess, the cantilever spring is received in the recess. This structure enables the cantilever spring to have a sufficient length in the vertical direction and thereby ensures a high level of elastic deformation.

In another preferable embodiment of the cap device of the invention, the torque mechanism includes a torque plate that is located between the handle mechanism and the closer in a freely rotatable manner. The first click engagement element is a click arm that is formed as a cantilever on the torque plate and has a click engagement projection. The second click engagement element is a click engagement element formed on the handle mechanism.

In still another preferable embodiment of the cap device of the invention, the torque mechanism has a stopper mechanism that stops rotation of the closer to prevent a torque applied to the closer from exceeding a torque limit of closing the tank opening. The stopper mechanism effectively prevents the closer from being clamped excessively. The stopper mechanism may have a projection that is protruded from the closer to engage with the opening engagement element and thereby stop rotation of the closer.

It is preferable that the cantilever spring has a spring constant that increases with an increase in rotational torque applied to the handle mechanism after the stop mechanism works to stop rotation of the closer. In this preferable structure, in response to a ration of the handle mechanism after the function of the stopper mechanism to stop rotation of the closer, the rotational torque does not rise abruptly but increases stepwise. This arrangement effectively prevents the user from incorrectly recognizing completion of a closing operation of the cap device. The user can thus naturally continue the closing operation to hear a click.

One preferable structure of varying the spring constant of the cantilever spring has a restriction member to partially restrict a motion of the cantilever spring, and the restriction member partially restricts the motion of the cantilever spring to vary the spring constant stepwise. The restriction member may include a first step that is formed at a position of pressing the cantilever spring, and a second step that is formed to press the cantilever spring at a position of a greater rotational angle of the handle mechanism than the position of the first step.

In one preferable embodiment, the cantilever spring is formed in spiral and is expanded or contracted by transmission of the rotational torque from the handle mechanism to generate the spring force.

These and other objects, features, aspects, and advantages of the present invention will become more apparent from the following detailed description of the preferred embodiments with the accompanied drawings.

BRIEF DESCRIPTION OF THE DRAWINGS

FIGS. 27(A), 27(B), 27(C) and 27(D) show operations of the torque transmission unit in the fifth embodiment.

DESCRIPTION OF THE PREFERRED EMBODIMENTS

Some modes of carrying out the invention are discussed below as preferred embodiments.

A. First Embodiment (1) General Structure of Fuel Cap 10

Figure 1:
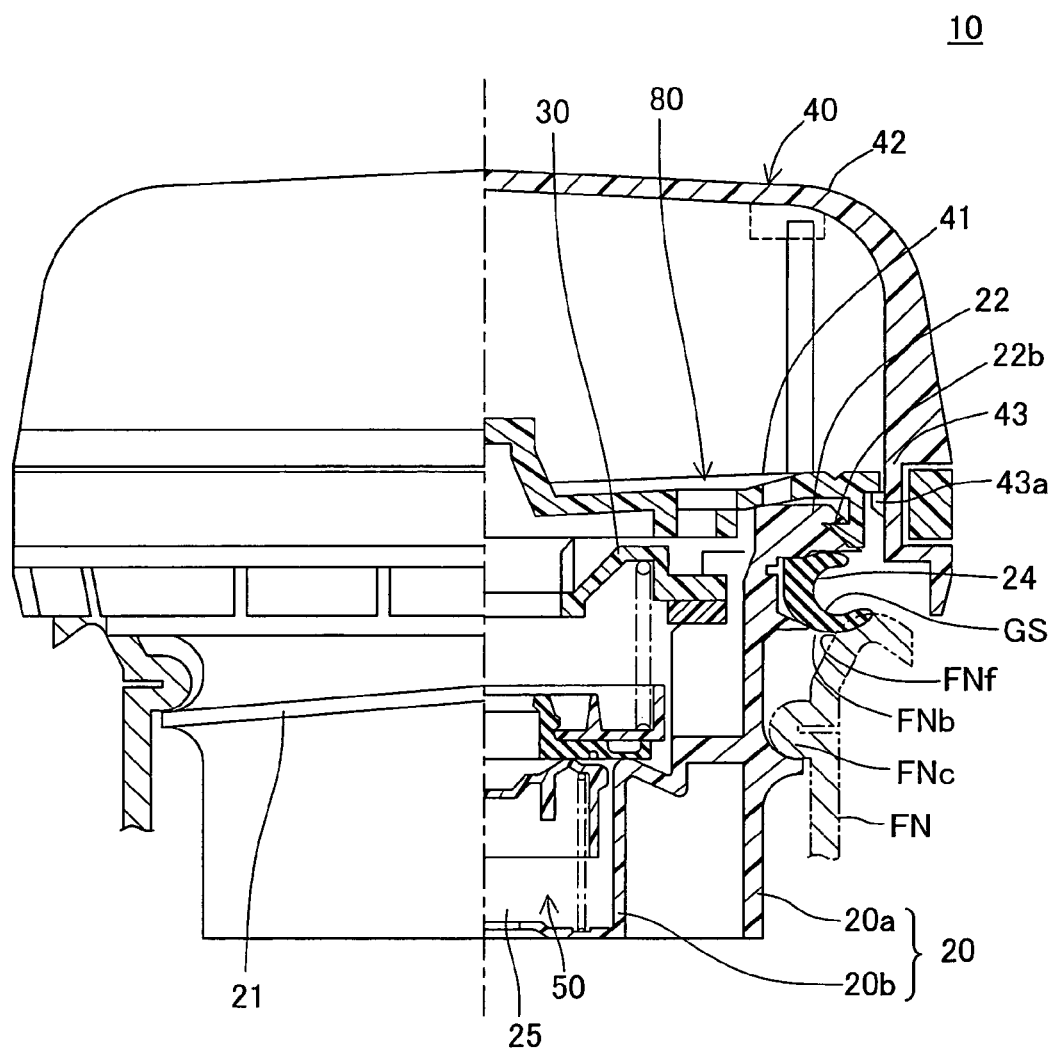
FIG. 1 is a half sectional view showing a fuel cap in a first embodiment of the invention.

FIG. 1 is a half sectional view showing a fuel cap 10 (cap device) in a first embodiment of the invention. The fuel cap 10 is attached to a filler neck FN having an inlet opening FNb (tank opening) to feed a supply of fuel to a fuel tank (not shown). The fuel cap 10 has a cap main body 20 (closer) that is made of a synthetic resin material like polyacetal, a cover 40 that is mounted on the cap main body 20 and is made of a synthetic resin material like nylon with a handle, an inner cover 30 that closes an upper opening of the cap main body 20 and forms a valve chest 25, a pressure regulating valve 50 that is received in the valve chest 25, a torque mechanism 80, and a ring-shaped gasket GS that is attached to the upper outer circumference of the cap main body 20 to seal the cap main body 20 against the filler neck FN.

(2) Construction of Constituents of Fuel Cap 10

The construction of the respective constituents of the fuel cap 10 in the embodiment is discussed below in detail.

(2)-1 Cap Main Body 20

The cap main body 20 has a substantially cylindrical outer tube 20a with a male threading element 21, which engages with a female threading element FNc formed on the inner wall of the pipe-shaped filler neck FN (opening-formation member), and a valve chest-formation member 20b that is located in the lower portion of the inside of the outer tube 20a. The valve chest-formation member 20b receives a positive pressure valve and a negative pressure valve functioning as the pressure regulating valve 50 therein. The inner cover 30 is pressed into the upper portion of the valve chest-formation member 20b to cover over the valve chest 25.

The gasket GS is set on a lower face of an upper flange 22 of the cap main body 20. The gasket GS is located between a seal support element 24 of the flange 22 and the inlet opening FNb of the filler neck FN. When the fuel cap 10 is inserted into the inlet opening FNb, the gasket GS is pressed against the seal support element 24 to exert the sealing effects.

Figure 2:
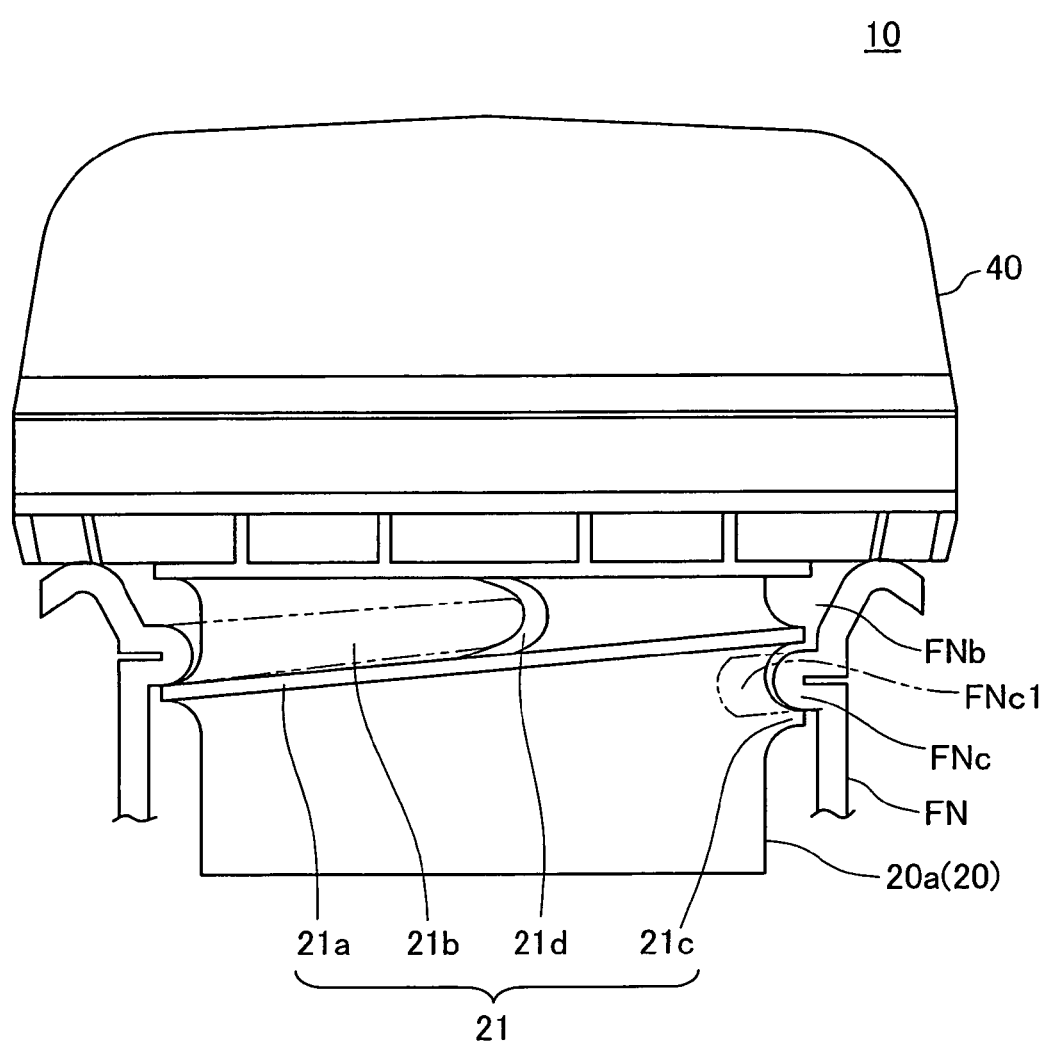
FIG. 2 shows the fuel cap that is screwed to a filler neck to close an inlet opening.
Figure 3:
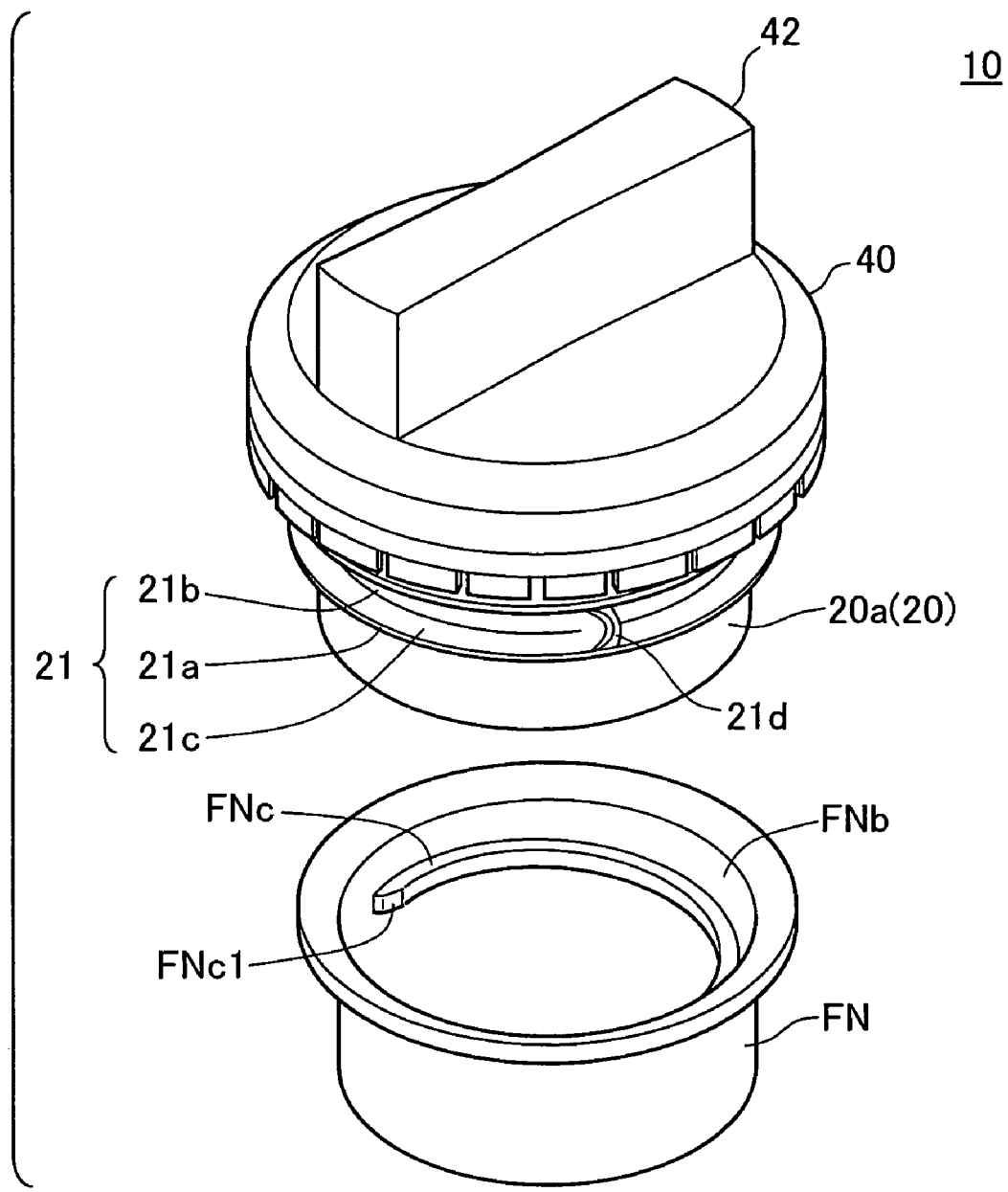
FIG. 3 is a perspective view showing the fuel cap detached from the filler neck.

FIG. 2 shows the fuel cap 10 that is screwed to the filler neck FN to close the inlet opening FNb. FIG. 3 is a perspective view showing the fuel cap 10 detached from the filler neck FN. With referring to FIGS. 2 and 3, a screw mechanism is formed on the inner circumferential wall of the filler neck FN and the outer circumference of the outer tube 20a of the cap main body 20. The screw mechanism functions to screw the fuel cap 10 to the filler neck FN, and includes the female threading element FNc formed on the inner wall of the filler neck FN and the male threading element 21 formed on the lower portion of the outer circumference of the outer tube 20a. The female threading element FNc is threading projections from a leader FNc1 close to the inlet opening FNb toward the depth of the fuel tank. The male threading element 21 has a thread ridge 21a and a thread groove 21b. The lower end of the thread ridge 21a is a leader 21c that engages with the leader FNc1 of the female threading element FNc (see FIG. 2). A stopper 21d is formed upright to cross the thread groove 21b. The stopper 21d is located at a position of about 200 degrees from the leader 21c of the male threading element 21. When the fuel cap 10 is inserted into the inlet opening FNb, the stopper 21d comes into contact with the leader FNc1 of the female threading element FNc to restrict further rotation of the fuel cap 10 in its closing direction. The female threading element FNc has a screw thread pitch of 6.35 mm per rotation.

When the fuel cap 10 fit in the inlet opening FNb is rotated in its closing direction, the male threading element 21 is screwed in the female threading element FNc. When the gasket GS is compressed in the axial direction to or over a preset displacement, the stopper 21d comes into contact with the leader FNc1 of the female threading element FNc to restrict further rotation. The fuel cap 10 is fastened to the filler neck FN in this state.

(2)-2 Gasket GS and Seal Support 24

(2)-2-1 Structure of Gasket GS

Figure 4:
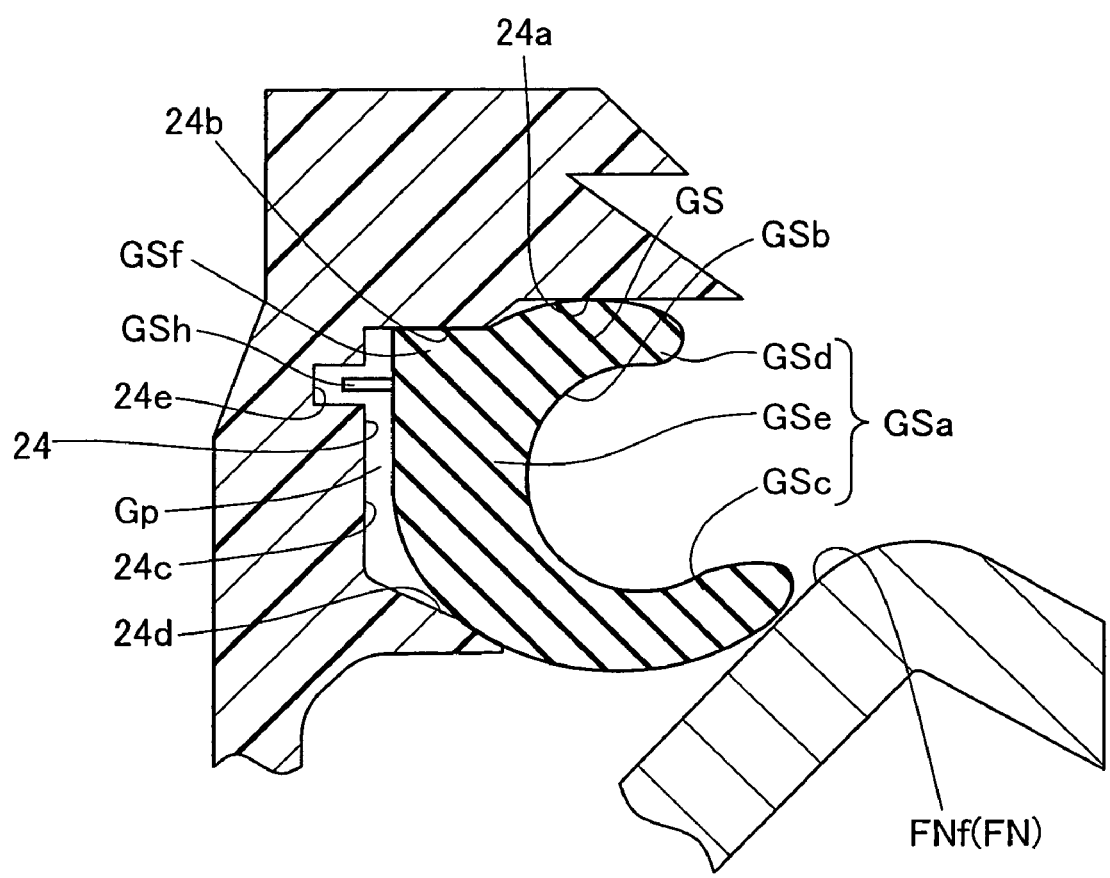
FIG. 4 is an enlarged sectional view showing a gasket attached to a seal support element of the fuel cap.

FIG. 4 is an enlarged sectional view showing the gasket GS set in the seal support 24 of the fuel cap 10. The gasket GS is made of fluorocarbon rubber and has a gasket main body GSa that is formed to have a substantially C-shaped cross section and is compressed to shorten the length in its bending direction. The gasket main body GSa of the C-shaped cross section is formed to surround a slit GSb of a substantially U-shaped cross section, which is open to the outer side. The gasket main body GSa includes a first lip GSc that is pressed against the sealing face FNf of the filler neck FN, a second lip GSd, and a link GSe that links the first lip GSc to the second lip GSd. The first lip GSc, the second lip GSd, and the link GSe form the C-shaped cross section of the gasket main body GSa.

Figure 5A:
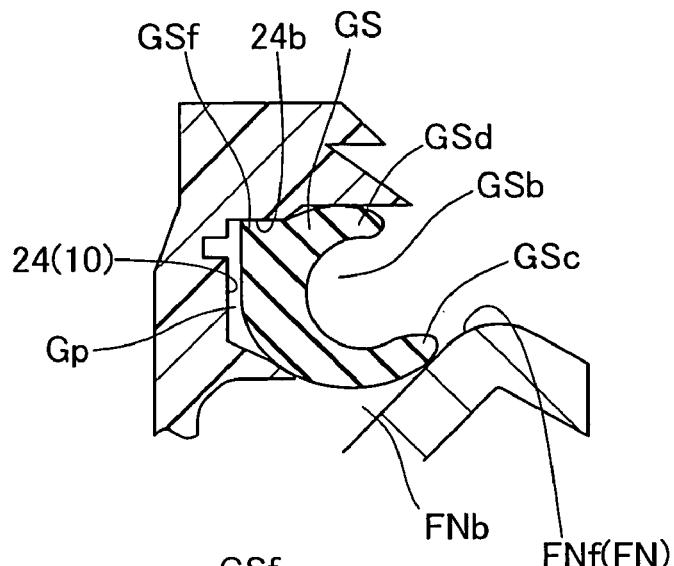
FIGS. 5(A), 5(B) and 5(C) show a process of compressing the gasket as the fuel cap is closed.
Figure 5B:
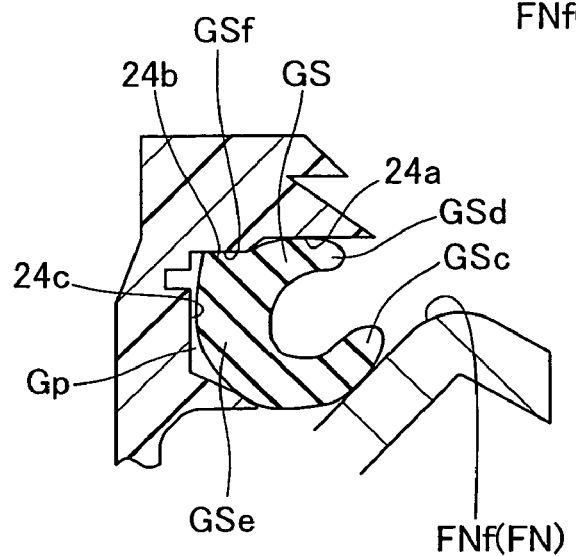
Figure 5C:
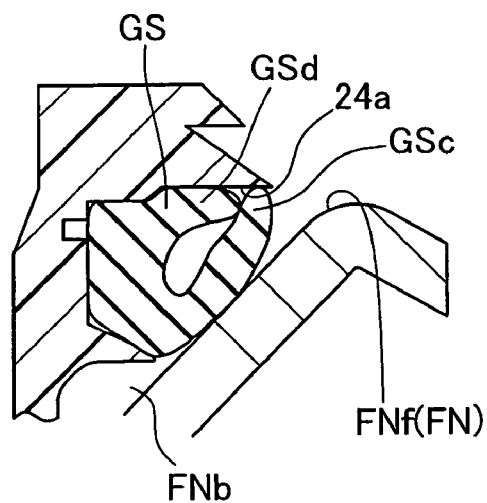

The first lip GSc is longer than the second lip GSd to bring the edge of the first lip GSc into contact with a first sealing wall 24a when the gasket GS is compressed by the sealing face FNf (see FIG. 5(C)). A baffle element GSf is protruded from the inner side of the gasket main body GSa to be located between the second lip GSd and the link GSe.

(2)-2-2 Structure of Seal Support 24

The seal support 24 is a circular recess to support the outer circumference of the gasket GS. The seal support 24 has a first sealing wall 24a that supports the second lip GSd, a stopper step 24b functioning as a stopper element, a second sealing wall 24c, and a lower sealing face 24d. The stopper step 24b positions the baffle element GSf of the gasket GS and thereby functions to stop rotation of the gasket GS when the first lip GSc is compressed by the sealing face FNf.

The second sealing wall 24c faces the link GSe of the gasket GS across a gap Gp. The gasket GS is elastically deformed to narrow the gap Gp when the first lip GSc receives a compressive force from the sealing face FNf.

The second sealing wall 24c has a circular sealing recess 24e to receive a gate end GSh, which is protruded from the outer circumference of the link GSe of the gasket GS. The gate end GSh is a trace of the gate used for injection molding the gasket GS. The sealing recess 24e functions to equalize the sealing face pressure in the circumferential direction when the gate end GSh comes into contact with the second sealing wall 24c.

(2)-2-3 Sealing Functions of Gasket GS

FIG. 5 shows a process of compressing the gasket GS as the fuel cap 10 is closed. In the initial stage of the closing operation of the fuel cap 10, the first lip GSc of the gasket GS comes into contact with the sealing face FNf (FIG. 5(A)). The further closing operation causes the first lip GSc to be compressed in the bending direction and narrow the opening of the slit GSb (FIG. 5(B)). At this stage, the baffle element GSf of the gasket GS is positioned by the stopper step 24b to prohibit rotation of the gasket GS. As the first lip GSc is pressed against the sealing face FNf, the link GSe is deformed to narrow the gap Gp relative to the second sealing wall 24c. The edge of the first lip GSc comes into contact with the first sealing wall 24a on the immediate side of the edge of the second lip GSd. This completes compression of the gasket (FIG. 5(C)), so that the fuel cap 10 closes the inlet opening FNb.

Figure 6:
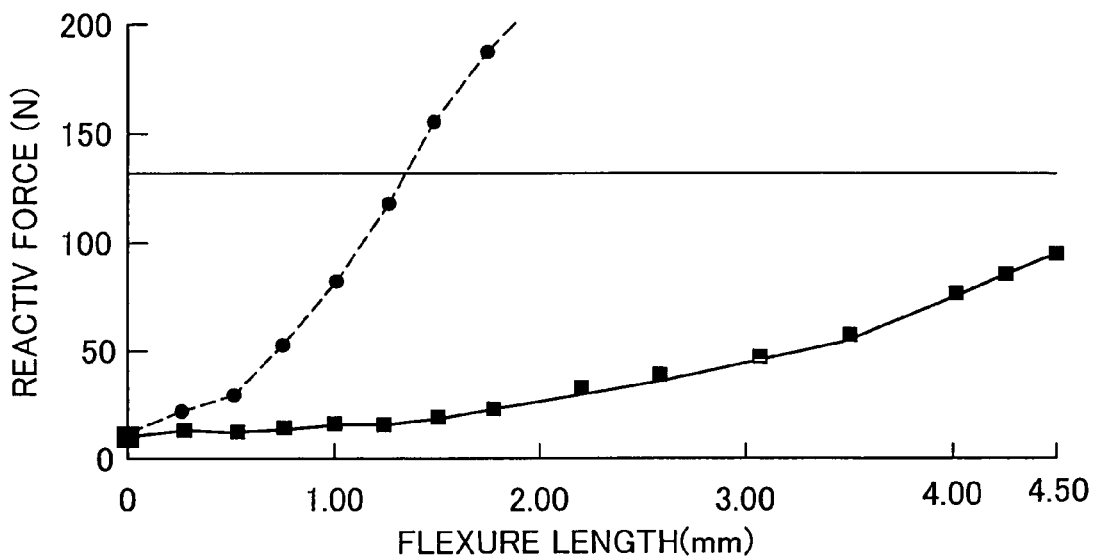
FIG. 6 is a graph showing variations in reactive force against the flexure length of the gasket.

FIG. 6 is a graph showing variations in reactive force against the flexure length of the gasket. The solid-line curve regards the gasket GS of the embodiment and the dotted-line curve regards a prior art C-shaped gasket. Here the flexure length represents a compressed length (compression degree) of the gasket in its bending direction. The relation between the flexure length and the rotational angle of the fuel cap depends upon various parameters like the hardness and the shape of the gasket. In an example where a 360-degree rotation of a fuel cap gives a flexure length of 6.35 mm, the fuel cap closed at an angle of 198 degrees gives a flexure length of 3.5 mm. The fuel cap rotated from its full close position in its opening direction by 90 degrees gives a flexure length of 1.9 mm.

The closing operation of the fuel cap bends the gasket and increases the reactive force of the gasket. The reactive force of greater than 150 N produced in the closing operation of the fuel cap deteriorates the operating performance of the fuel cap. The reactive force is thus preferably not greater than 150 N or more preferably not greater than 130 N. The prior art gasket gives only a flexure length of about 1.5 mm at the reactive force of 150 N and has an abrupt increase in reactive force to deteriorate the operating performance. The gasket GS of the embodiment, on the other hand, gives a flexure length of at least 4.5 mm in the full close position and does not have any abrupt increase in reactive force to ensure the good operating performance.

Figure 7:
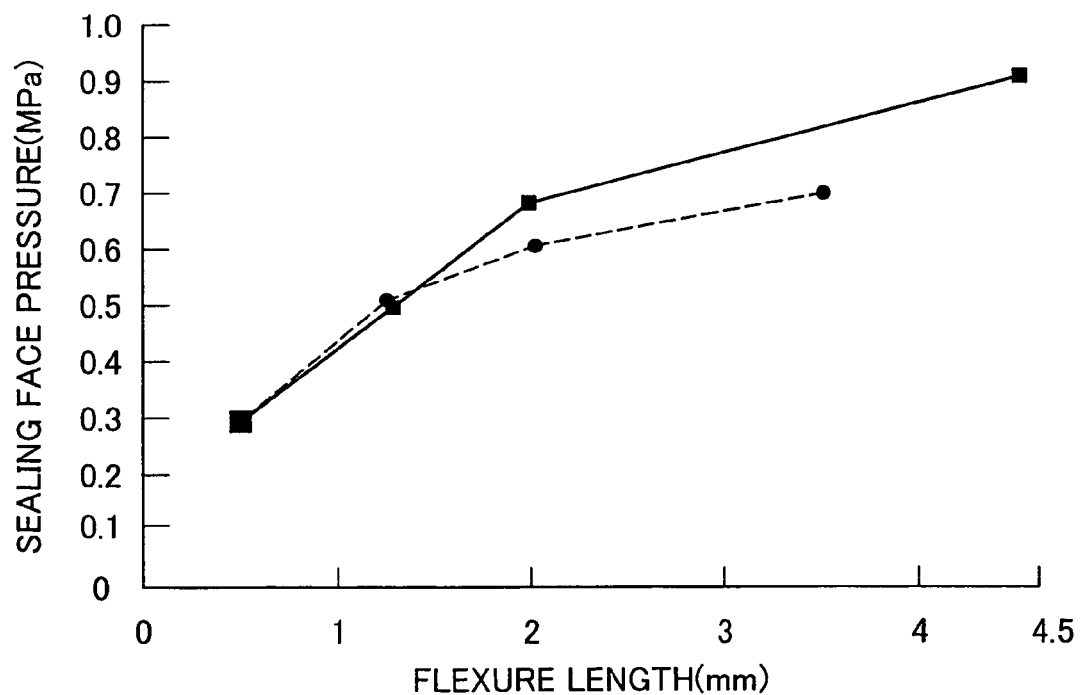
FIG. 7 is a graph showing variations in sealing face pressure against the flexure length of the gasket.

FIG. 7 is a graph showing variations in sealing face pressure against the flexure length of the gasket. The solid-line curve regards the gasket GS of the embodiment and the dotted-line curve regards the prior art C-shaped gasket. Here the sealing face pressure represents a pressure of the gasket against the sealing face FNf. As the fuel cap 10 is closed, the sealing face pressure increases with an increase in flexure length of the gasket GS.

In order to ensure the sealing face pressure of at least a preset level against the flexure length of the gasket GS and prevent an excessive stress from being applied to the gasket GS, the stopper 21d (see FIG. 2) defines the full closing depth to be not less than 2 mm or preferably to be in a range of 3 to 5 mm.

(2)-2-4 Effects of Gasket GS

1. The combination of the stopper 21d and the stopper step 24b positions the gasket GS and stops rotation of the gasket GS. As the first lip GSc is pressed against the sealing face FNf, the link GSe is readily deformed to narrow the gap Gp relative to the second sealing wall 24c. This arrangement gives a sufficiently large sealing face pressure with a relatively small closing force and ensures the good operating performance.

2. The first lip GSc is designed to be longer than the second lip GSd. When the sealing face FNf is pressed against the first lip GSc to compress the gasket GS, the end of the long first lip GSc comes into contact with the first sealing wall 24a. This design prevents the first lip GSc from coming into contact with the second lip GSd to interfere with sufficient deformation, thus attaining a sufficiently high displacement with a relatively little loading.

3. The fuel cap 10 may adopt a quick-turn structure to open and close the inlet opening FNb by simple rotation of a preset angle, for example, 180 degrees. In this structure, the cover 40 is generally required to have a lost motion mechanism that idles in the range of a preset angle, in order to prevent a decrease in sealing face pressure of the gasket due to an external force applied to the cover 40. The gasket GS of the embodiment, however, ensures the high sealing properties even when the cover 40 receives an external force and rotates in its opening direction by approximately 90 degrees in to decrease the flexure length to about 1.6 mm. The gasket GS of the embodiment thus ensures the sufficient sealing face pressure of or over a preset level without the lost motion mechanism of the complicated structure.

4. The fuel cap 10 of the embodiment has the large screw thread pitch to move the cap main body 20 by at least 3 mm in the axial direction with a rotation of 180 degrees. This structure enables the fuel cap 10 to be opened and closed by rotation of a small angle and thus ensures the good operating performance.

5. The gasket GS preferably has the reactive force of not higher than 100 N against the flexure length of 4 mm and the sealing face pressure of not lower than 0.5 MPa. It is preferable that a rotation of the closer by 80 to 90 degrees from the closing start position is equivalent to a moving distance of 1.4 mm to 1.6 mm in the axial direction. This arrangement desirably ensures the sufficient sealing properties of the gasket GS even when the closer is rotated by approximately 90 degrees in its opening direction from the full close position due to an external force.

(2)-3 Structure of Cover

Referring back to FIG. 1, the cover 40 functions as a manipulating mechanism and is attached to the flange 22 via the torque mechanism 80 in a rotatable and freely detachable manner. The cover 40 includes an upper wall 41, a handle 42 mounted on the upper wall 41, and a side wall 43 formed around the upper wall 41, and is integrally made of a conductive resin by injection molding. Four engagement projections 43a are protruded inward from the side wall 43 to be arranged at equal intervals along the circumference. The engagement projections 43a function to fix the cover 40 to the cap main body 20 via the torque mechanism 80. The attachment structure of the cover 40 will be discussed later.

(2)-4 Structure of Torque Mechanism 80

(2)-4-1 General Structure of Torque Mechanism 80

Figure 8:
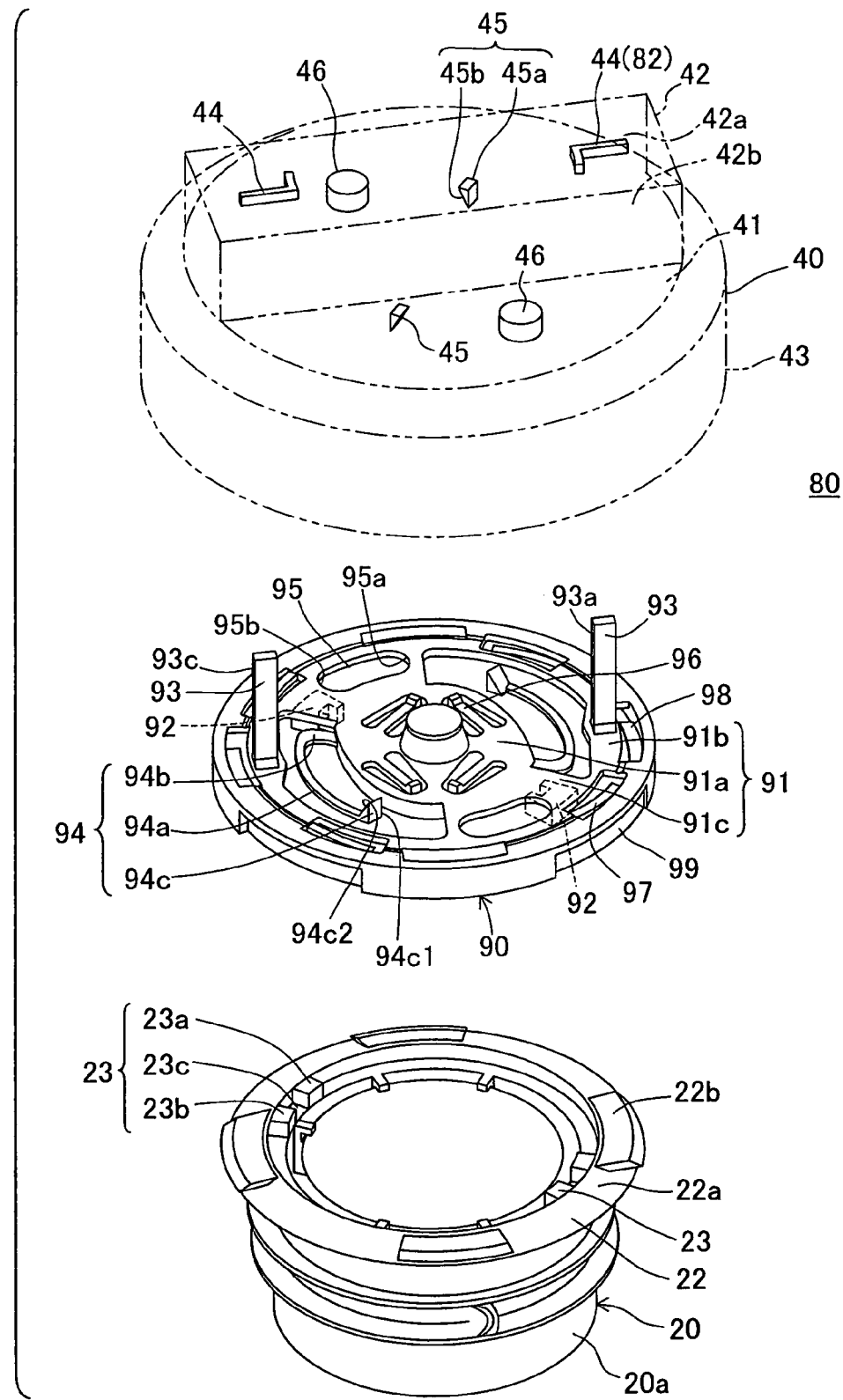
FIG. 8 is a decomposed perspective view showing a torque mechanism located on a cover and an upper portion of a cap main body.
Figure 9:
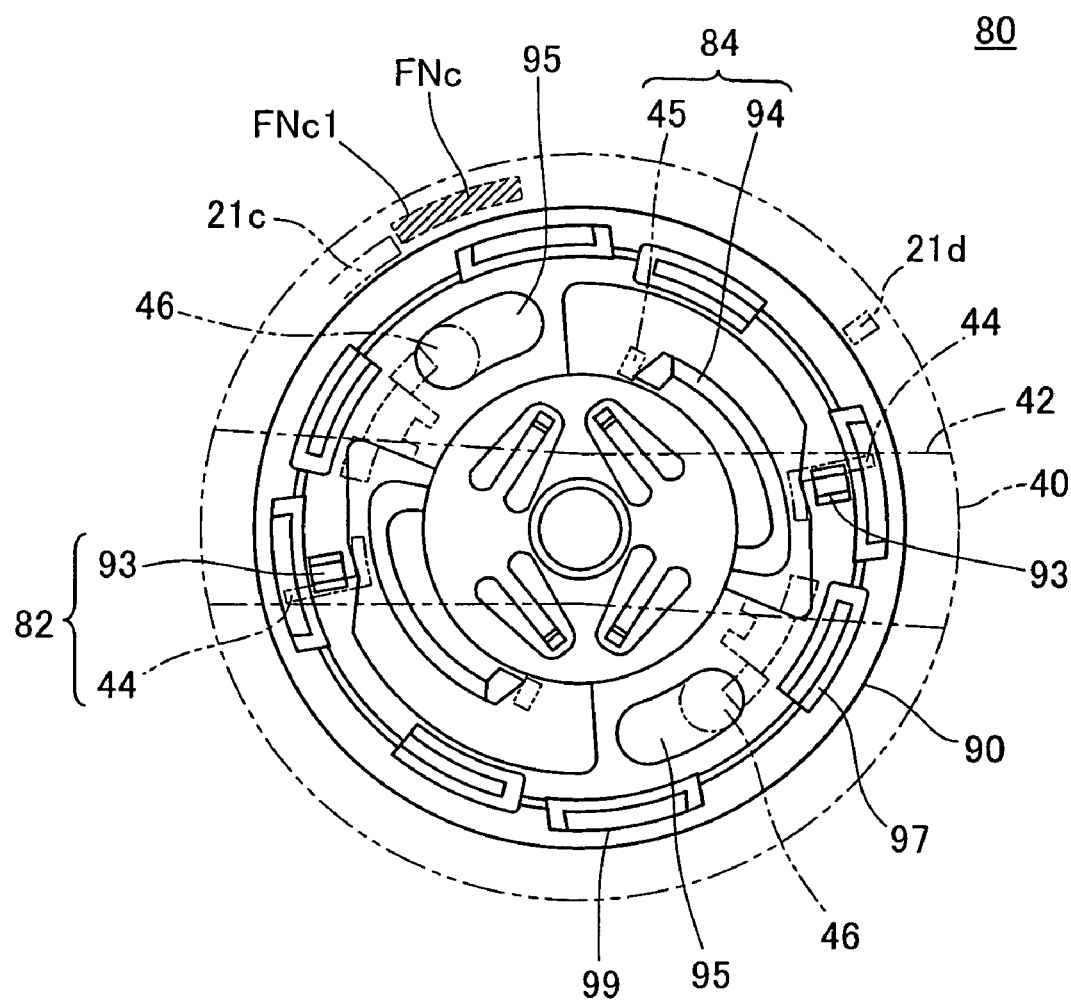
FIG. 9 is a top view of the torque mechanism.

FIG. 8 is a decomposed perspective view illustrating the torque mechanism 80 located on the cover 40 and the upper portion of the cap main body 20. FIG. 9 is a top view of the torque mechanism 80. The torque mechanism 80 includes a torque transmission unit 82 and a click unit 84 as shown in FIG. 9. The click unit 84 clicks when the rotational torque transmitted by the torque transmission unit 82 exceeds a preset level of rotational torque in a closing operation of the fuel cap 10 to close the inlet opening FNb as shown in FIG. 3. The click sound enables the user to confirm that the fuel cap 10 is fastened to the filler neck FN with a rotational torque of or over the preset level.

Referring to FIG. 8, the torque mechanism 80 includes a torque plate 90 that is located in a rotatable manner between the cover 40 and the cap main body 20. The torque plate 90 has a disc-shaped torque body 91 made of a resin. The torque body 91 includes a disc-shaped arm support 91a, an outer ring 91b surrounding the arm support 91a, and a link 91c linking the arm support 91a to the outer ring 91b. Guide grooves, torque arms, cantilever springs, and spring elements are formed on the torque body 91. These elements function as the torque transmission unit 82 and the click unit 84.

(2)-4-2 Torque Transmission Unit 82

The torque transmission unit 82 has a pair of first transmission mechanisms to transmit the rotational torque from the cover 40 to the torque plate 90 and a pair of second transmission mechanisms to transmit the rotational torque from the torque plate 90 to the cap main body 20.

Each of the first transmission mechanisms includes a torque transmission rib 44 formed on the cover 40 and a cantilever spring 93 that is protruded from the torque plate 90 in an elastically deformable manner. The torque transmission rib 44 is formed on an inner wall 42a of the handle 42 to be extended in a radial direction. The two torque transmission ribs 44 are arranged about a center axis of the cover 40 to be apart from each other by a predetermined distance. The cantilever spring 93 is a columnar member integrally formed with the torque body 91 to be protruded from the plane of the torque body 91 in the vertical direction. The cantilever spring 93 is inserted into a recess 42b of the handle 42, and has an engagement end 93a that engages with the torque transmission rib 44.

Figure 10A:
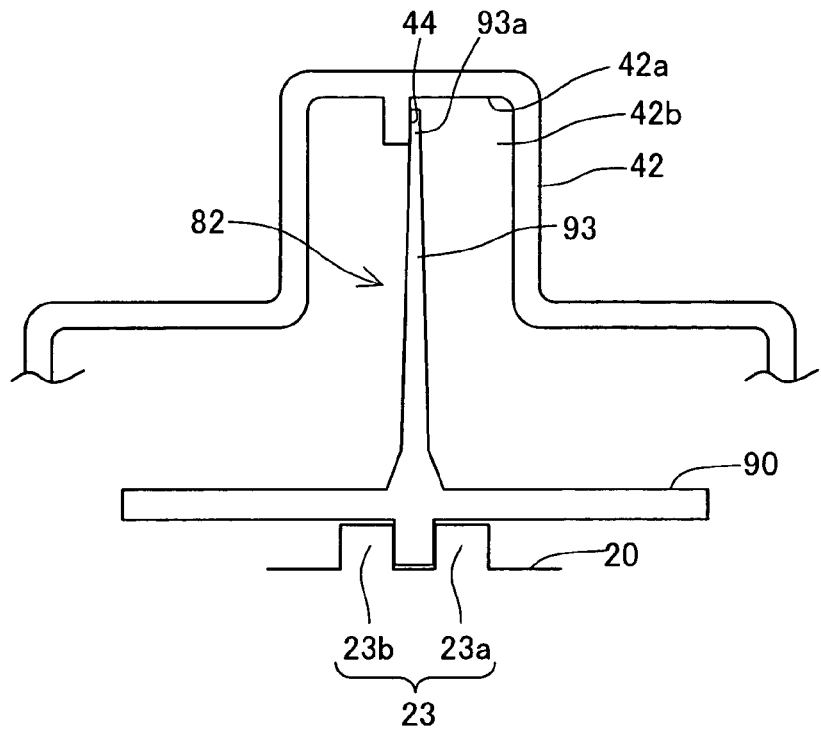
FIGS. 10(A) and 10(B) show operations of a first transmission mechanism of a torque transmission unit
Figure 10B:
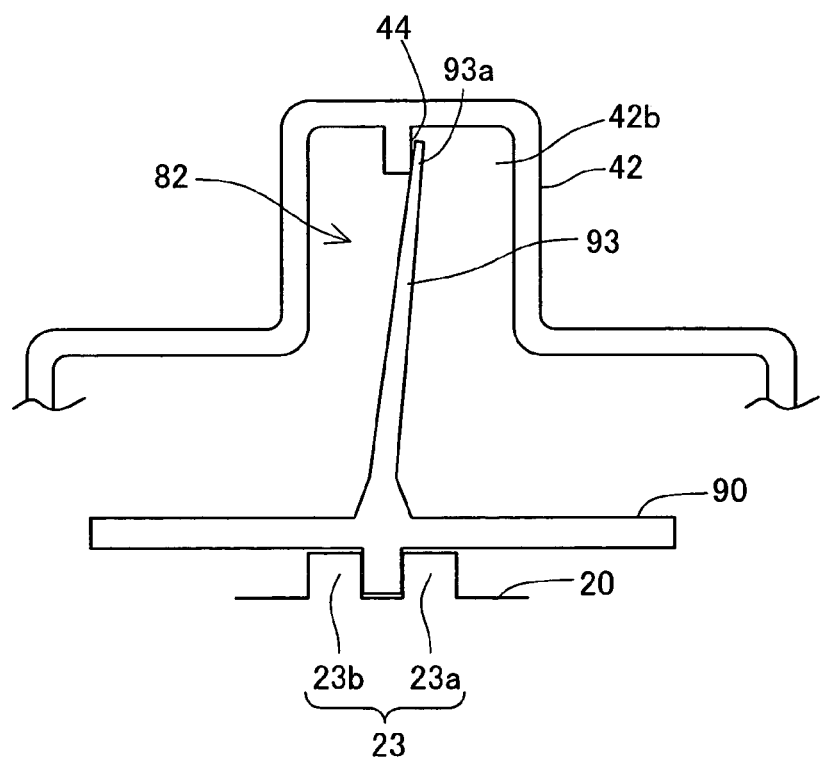

FIG. 10 shows operations of the first transmission mechanism of the torque transmission unit 82. In response to a rotation of the handle 42 in a closing direction, the torque transmission rib 44 engages with the engagement end 93a of the cantilever spring 93 and transmits the rotational torque to the torque plate 90 as shown in FIG. 10(A). The cantilever spring 93 is deformed and inclined to accumulate the spring force in an opening direction with an increase in degree of elastic deformation. The functions of the spring force will be discussed later.

As shown in FIGS. 8 and 9, the first transmission mechanism further includes a guide projection 46 protruded from the inner face of the upper wall 41 of the cover 40 and a rib guide element 95 formed in the torque plate 90. The guide projection 46 is a cylindrical projection to mainly transmit the rotational torque in an opening direction. The rib guide element 95 is an arc-shaped groove formed in the torque plate 90 and has two ends functioning as pressure ends 95a and 95b. The rib guide element 95 movably supports the guide projection 46 inserted and received therein.

Each of the second transmission mechanisms includes a guide projection 92 formed on the bottom face of the torque plate 90 and a body engagement element 23 formed on the cap main body 20 to transmit the rotational torque from the torque plate 90 to the cap main body 20. The body engagement element 23 is located on the inner circumference of the flange 22, and includes a pair of pressure projections 23a and 23b that are arranged across a predetermined interval and a guide step 23c that is formed between the pair of pressure projections 23a and 23b. The guide projection 92 that is received in the guide step 23c comes into contact with one pressure projection 23a in response to rotation of the torque plate 90 in a closing direction, while coming into contact with the other pressure projection 23b in response to rotation of the torque plate 90 in an opening direction. This structure accordingly transmits the rotational torque from the torque plate 90 to the cap main body 20.

(2)-4-3 Click Unit 84

The click unit 84 includes a pair of click engagement elements 45 protruded from the bottom of the upper wall 41 of the cover 40 and a pair of click arms 94 formed on the torque plate 90. Each of the click engagement elements 45 includes a pressure plane 45a formed to face in the radially outward direction and a downward inclined plane 45b formed to face in the circumferential direction. Each of the click arms 94 includes an arm body 94a protruded from the arm support 91a and a click engagement projection 94c protruded upward from a free end of the arm body 94a. The click arm 94 is a cantilever with a support base 94b as the fulcrum. The click engagement projection 94c is located apart from the torque body 91 by a predetermined distance. A vertical wall 94c1 is formed on one end of the click engagement projection 94c to face in the radially inward direction and is pressed by the pressure plane 45a of the click engagement element 45. An inclined plane 94c2 is formed to face in the circumferential direction and is pressed by the inclined plane 45b of the click engagement element 45.

Figure 11A:
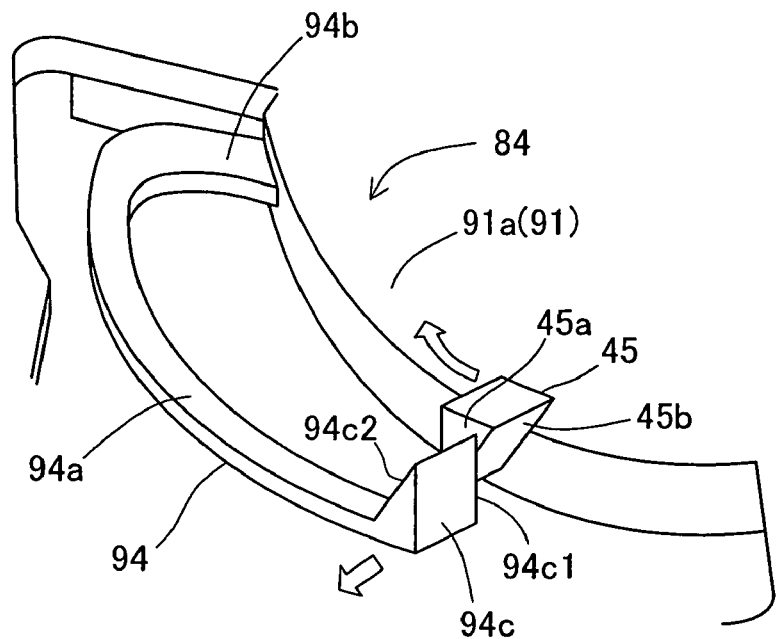
FIGS. 11(A) and 11(B) show operations of a click unit.
Figure 11B:
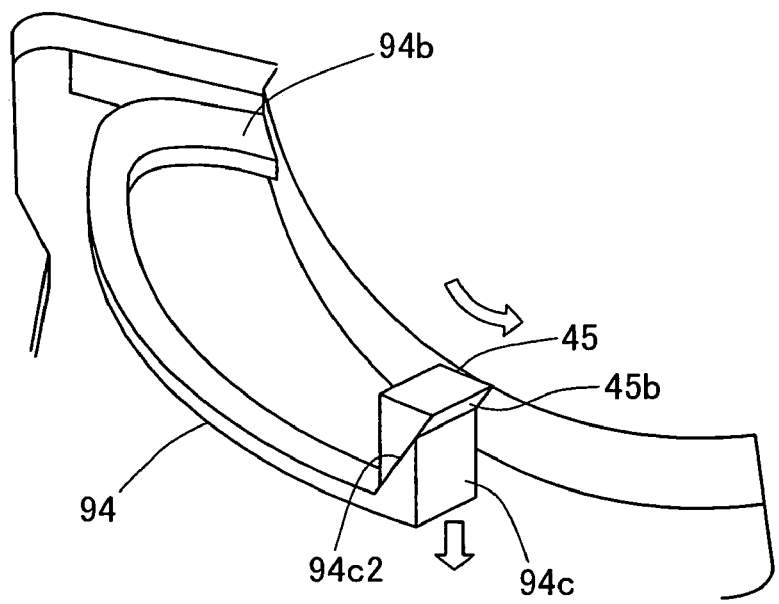

FIG. 11 shows operations of the click unit 84. In response to rotation of the cover 40 in a closing direction, as shown in FIG. 11(A), the pressure plane 45a of the click engagement element 45 presses the vertical wall 94c1 of the click engagement projection 94c. The click arm 94 is accordingly deformed outward with the support base 94b as the fulcrum and is caught by the click engagement element 45. In this state, the pressure plane 45a of the click engagement element 45 rides over the vertical wall 94c1 of the click engagement projection 94c. The click engagement projection 94c accordingly bumps against the outer circumference of the arm support 91a to give a click sound. In response to rotation of the cover 40 in an opening direction, on the other hand, as shown in FIG. 11(B), the inclined plane 45b of the click engagement element 45 presses the inclined plane 94c2 of the click arm 94 to press the click arm 94 down with the support base 94b as the fulcrum. The click arm 94 requires a smaller level of rigidity for a downward deformation, compared with the rigidity required for an outward deformation. The click engagement element 45 and the click engagement projection 94c smoothly slip against each other via the respective inclined planes 45b and 94c2. The rotation in the opening direction accordingly gives a smaller click sound than the rotation in the closing direction.

(2)-4-4 Attachment Structure of Torque Plate 90 and Cover 40

Figure 12:
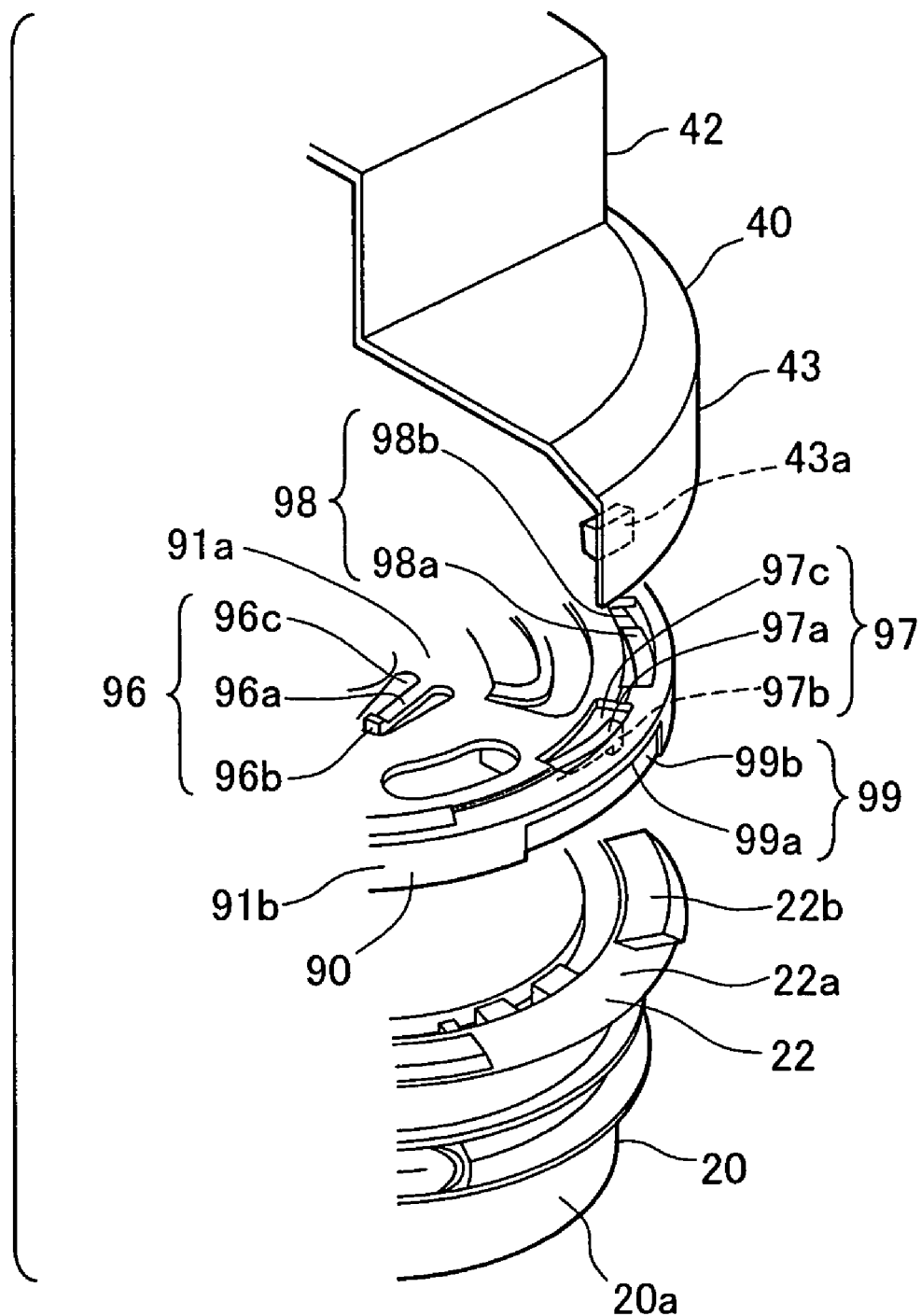
FIG. 12 is a perspective view showing essential part of the torque mechanism shown in FIG. 8.
Figure 13:
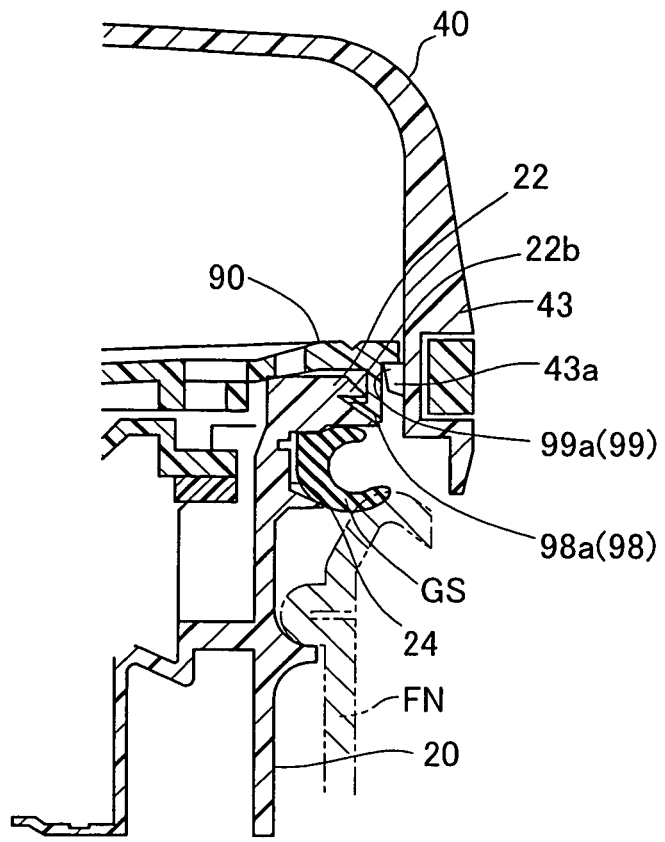
FIG. 13 is a sectional view showing the side of the fuel cap.

The following describes the attachment structure (plate attachment mechanism) of the cap main body 20 and the torque plate 90 and the attachment structure (grip attachment mechanism) of the torque plate 90 and the cover 40. FIG. 12 is a perspective view showing essential part of the torque mechanism 80 shown in FIG. 8. FIG. 13 is a sectional view showing the side of the fuel cap 10. Catching claws 98a of plate engagement elements 98 are formed along the inner circumference of the outer ring 91b of the torque plate 90. The catching claws 98a are protruded from the inner wall of the outer ring 91b toward the center axis and are formed to be observable from the top through notches 98b and elastically deformable in the axial direction. Arc-shaped catching projections 22b are formed on the outer circumference of the flange 22 of the cap main body 20. The torque plate 90 is attached to the cap main body 20 in a rotatable manner through engagement of the catching claws 98a with the catching projections 22b.

Fixation elements 99 are arranged on the outer circumference of the outer ring 91b of the torque plate 90. Each of the fixation elements 99 has a catching recess 99b to form a catching claw 99a. The engagement projections 43a formed inward on the side wall 43 of the cover 40 are fit in the catching recesses 99b of the mating fixation elements 99, so that the torque plate 90 supports the cover 40 in a rotatable manner (approximately 20 degrees). The fixation positions of the engagement projections 43a with the catching recesses 99b of the fixation elements 99 is located above the fixation positions of the catching claws 98a of the plate engagement elements 98 with the catching projections 22b of the flange 22.

The torque plate 90 is attached to the cap main body 20 through engagement of catching claws 98a of the plate engagement elements 98 of the torque plate 90 with the catching projections 22b of the flange 22 of the cap main body 20. The cover 40 is then attached to the torque plate 90 through engagement of the engagement projections 43a of the cover 40 with the catching claws 99a of the torque plate 90. This assembles the cap main body 20, the torque plate 90, and the cover 40 to the fuel cap 10.

(2)-4-5 Support Mechanism of Torque Plate 90

Figure 14:
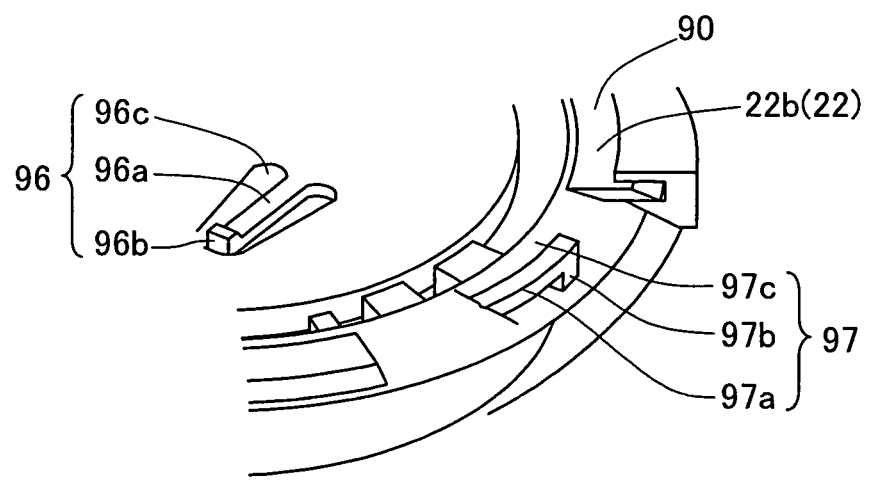
FIG. 14 shows periphery of a torque plate included in the torque mechanism.
Figure 15:
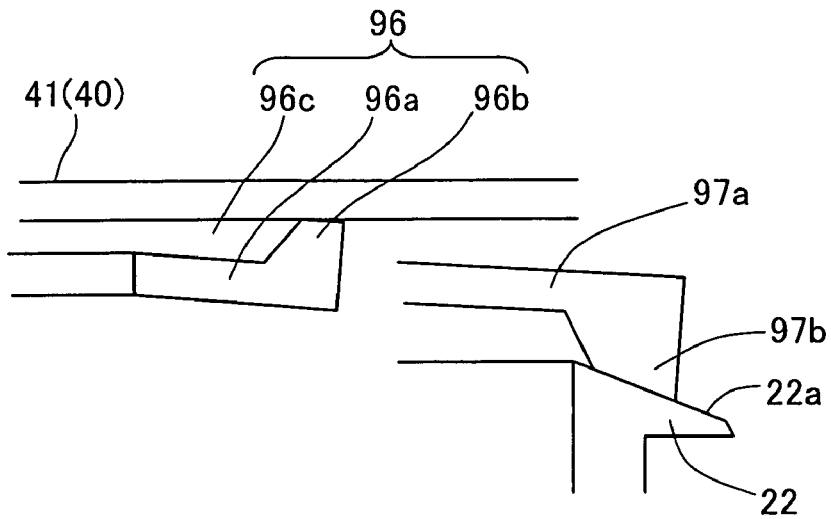
FIG. 15 shows functions of first spring elements and second spring elements.

FIG. 14 shows the periphery of the torque plate 90. As shown in FIGS. 10 and 14, the torque plate 90 has first spring elements 96 and second spring elements 97 to hold the torque plate 90 between the bottom face of the upper wall 41 of the cover 40 and the upper portion of the cap main body 20. The four first spring elements 96 are arranged at angles of 90 degrees in the circumferential direction on the center portion of the torque plate 90. The first spring elements 96 apply a spring force in a vertical direction to the bottom face of the upper wall 41 of the cover 40. As shown in FIG. 15, each of the first spring elements 96 has an arm 96a that is formed on the same plane as the top face of the torque plate 90 and is extended as a cantilever in the circumferential direction, and a pressure projection 96b that is formed on a free end of the arm 96a to be protruded upward from the top face of the torque plate 90. Each of the second spring elements 97 has an arm body 97a that is formed as a cantilever slightly inclined downward, and a pressure projection 97b that is formed on a free end of the arm body 97a to be pressed against an inclined upper plane 22a of the flange 22. One end of the second spring element 97 is tilted in a notch 97c formed on the top face of the torque plate 90. The pressure projections 97b of the second spring elements 97 press the inclined upper plane 22a of the flange 22, so that the second spring elements 97 are positioned in both the vertical direction and in the radial direction.

(3) Opening and Closing Operations of Fuel Cap 10

The following describes the functions of the torque mechanism 80 when the inlet opening FNb of the filler neck FN is opened and closed by the fuel cap 10. The torque mechanism 80 has the two torque transmission ribs 44, 44, the two guide projections 46, 46, and the two cantilever springs 93, 93 arranged symmetrically about the rotational axis of the cover 40. The following description thus mainly regards only one set of the symmetrical structure of the torque mechanism 80.

(3)-1 Closing Operation of Fuel Cap 10

As shown in FIG. 3, the user holds the handle 42 of the cover 40 and inserts the cap main body 20 in the axial direction into the open inlet opening FNb. The leader 21c of the male threading element 21 is set on the leader FNc1 of the female threading element FNc. When the user applies a clockwise rotational force to the handle 42 in the closing direction, the torque mechanism 80 performs a series of operations as shown in FIGS. 16 to 19.

Figure 16:
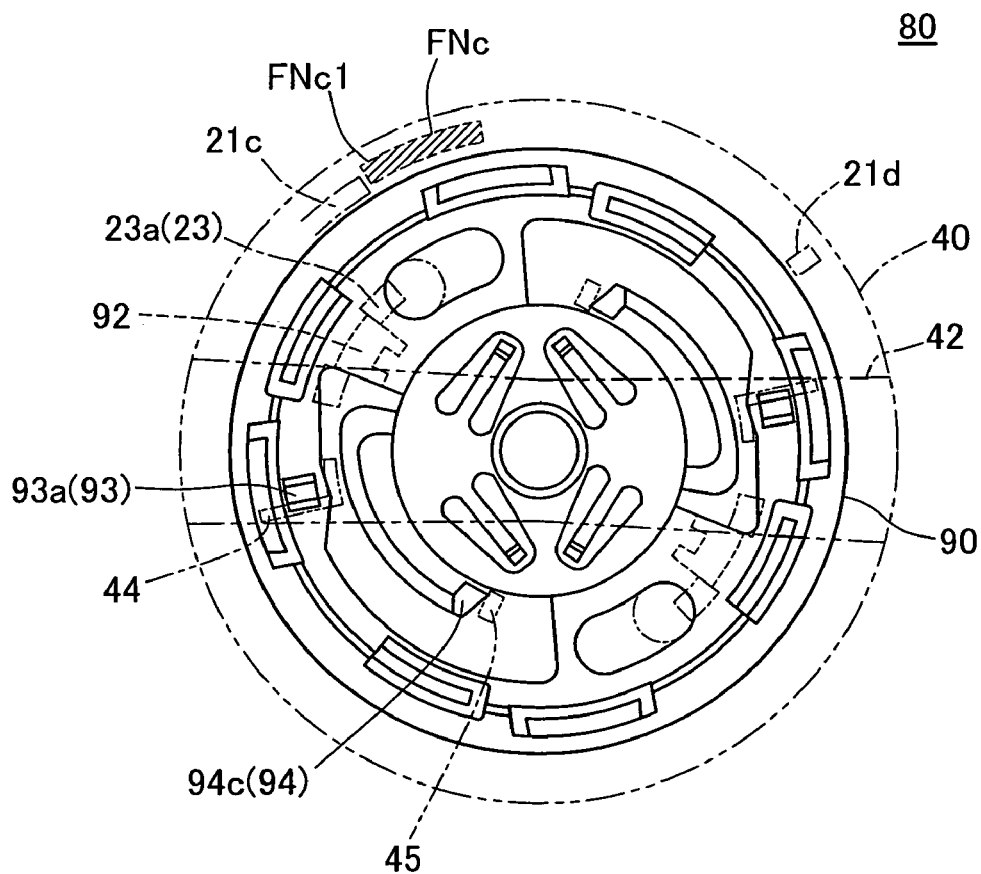
FIG. 16 shows a series of operations of the torque mechanism.

In the state of FIG. 16, the torque transmission rib 44 engages with the engagement end 93a of the cantilever spring 93 to incline the cantilever spring 93, while the click engagement element 45 engages with the click engagement projection 94c of the click arm 94. The clockwise rotational force applied to the handle 42 is accordingly transmitted to the torque plate 90 to rotate the torque plate 90 clockwise. In response to this rotation of the torque plate 90, the guide projection 92 presses the pressure projection 23a of the body engagement element 23. The cover 40, the torque plate 90, and the cap main body 20 then rotate integrally in the closing direction of the inlet opening FNb. The rotational torque transmitted from the handle 42 to the cap main body 20 increases with an increase in inclined angle of the cantilever spring 93 by the torque transmission rib 44 as shown in FIG. 10.

Figure 17:
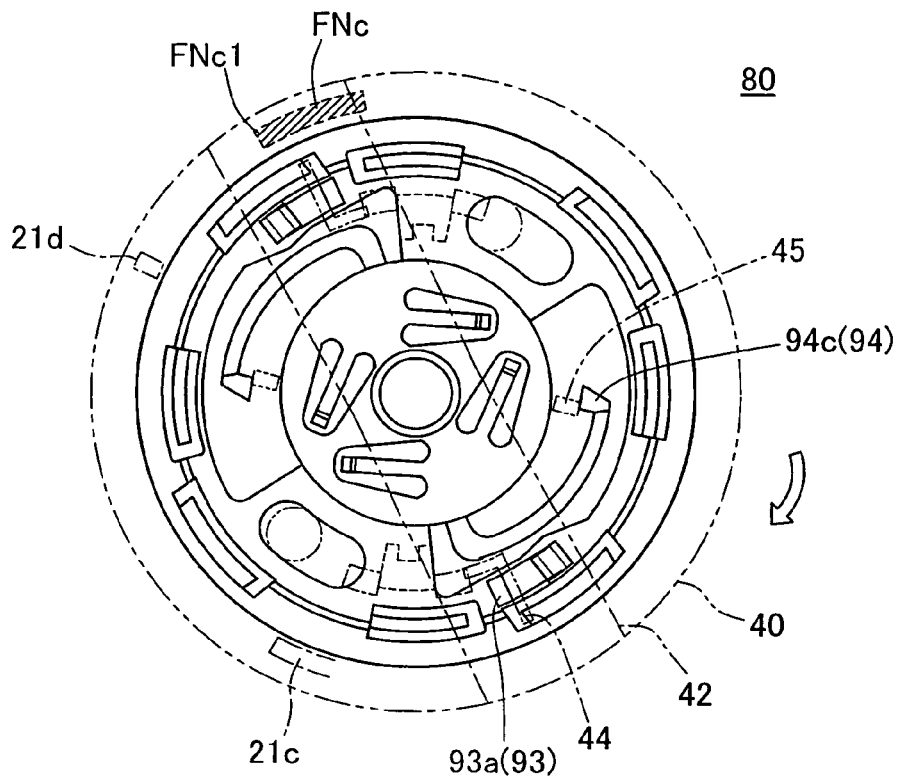
FIG. 17 shows the series of operations of the torque mechanism after the state of FIG. 16.
Figure 18:
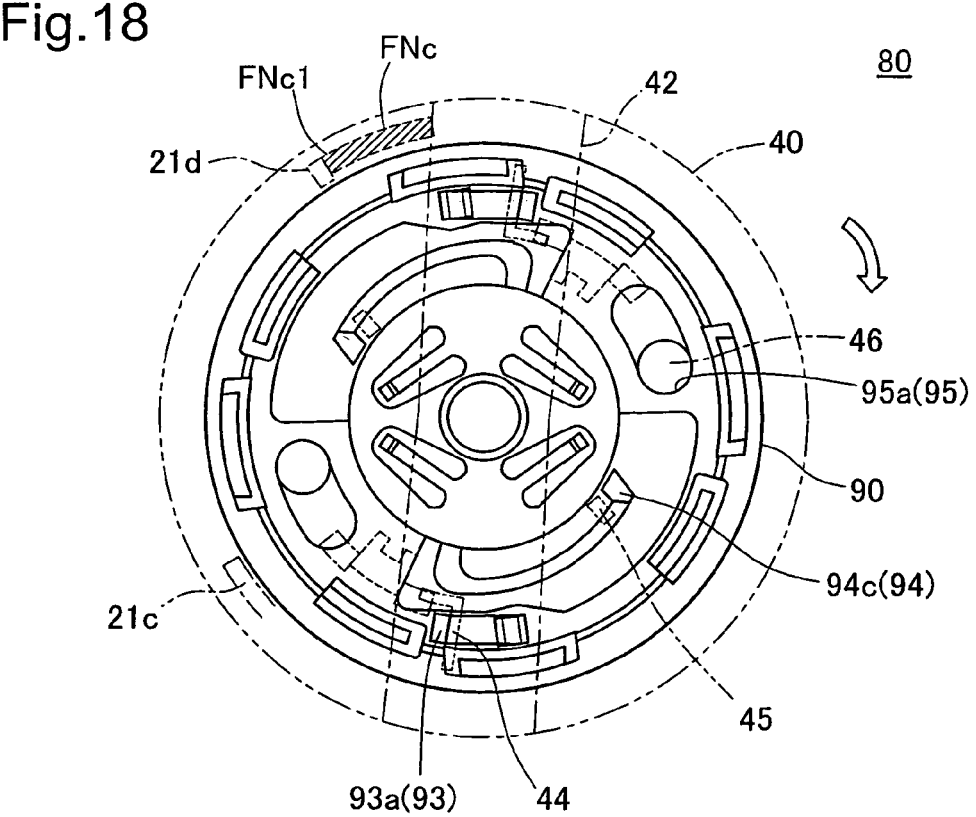
FIG. 18 shows the series of operations of the torque mechanism after the state of FIG. 17.

When the reactive force produced by the increasing engagement force exceeds a preset rotational torque, the click engagement element 45 rides over the click arm 94 as shown in FIG. 17 to be set in a released position shown in FIG. 18. The click engagement projection 94c comes over the click engagement element 45 and bumps against the outer circumference of the arm support 91a to give a click sound. The user can thus confirm that the fuel cap 10 is successfully clamped. The guide projection 46 is guided and moves in the rib guide element 95 to come into contact with the pressure end 95a. Even when the user tries to continue rotating the handle 42 in the closing direction in this state, the stopper 21d is in contact with the leader FNc1 of the filler neck FN. This structure desirably prevents the cap main body 20 from being clamped excessively.

Figure 19:
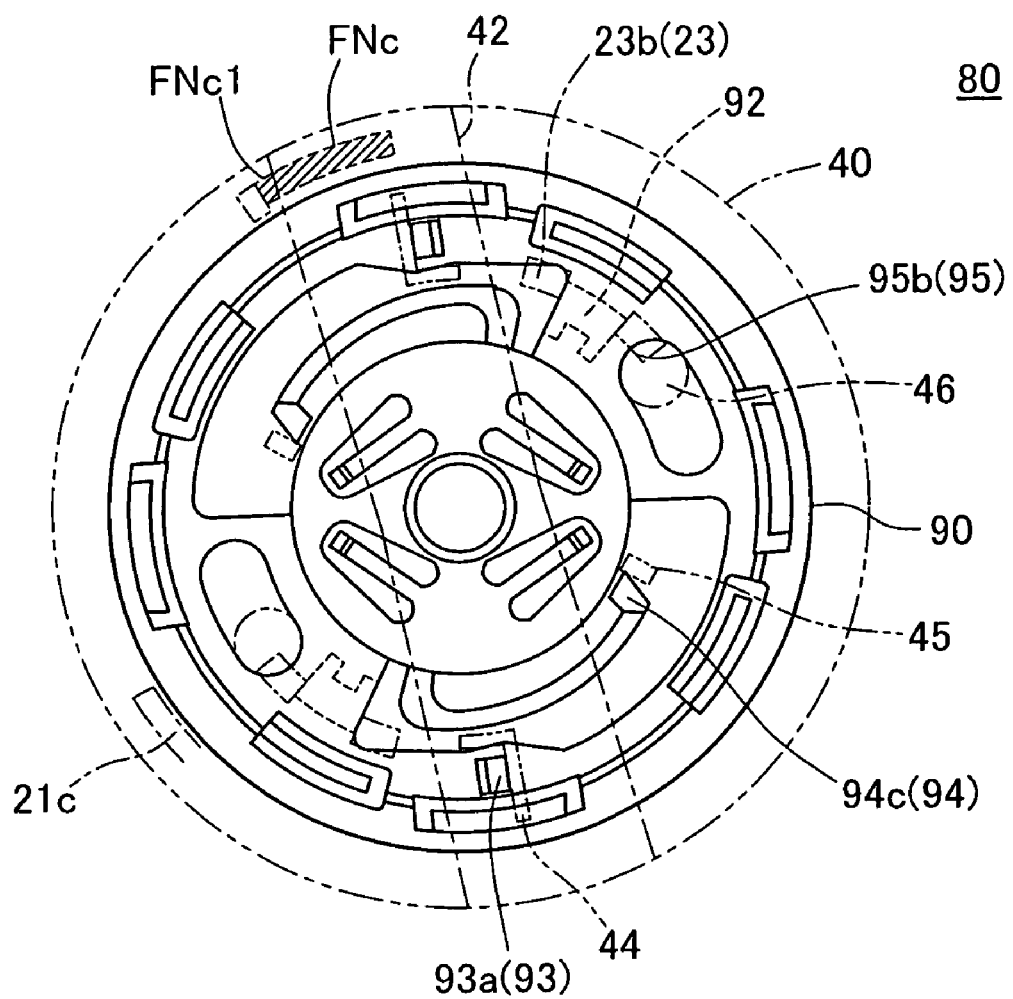
FIG. 19 shows the series of operations of the torque mechanism after the state of FIG. 18.

When the user releases the hold of the handle 42, the cantilever spring 93 applies a counterclockwise rotational force to the cover 40 via the torque transmission rib 44 as shown in FIG. 19. In response to this counterclockwise rotation of the cover 40, the inclined plane 45b of the click engagement element 45 presses the click arm 94 down to be slid against and ride over the click engagement projection 94c as shown in FIG. 11. The guide projection 46 moves in the rib guide element 95 to come into contact with the pressure end 95b and stop rotation of the cover 40. The fuel cap 10 closes the inlet opening FNb in this state.

(3)-2 Opening Operation of Fuel Cap 10

In order to open the fuel cap 10, the user holds the handle 42 of the cover 40 and applies a counterclockwise rotational force to the cover 40 in the state of FIG. 19. The guide projection 46 of the cover 40 then presses the pressure end 95b of the rib guide element 95 formed in the torque plate 90 to rotate the torque plate 90. In response to the rotation of the torque plate 90, the guide projection 92 presses the pressure projection 23b of the body engagement element 23. The rotational force applied to the cover 40 is then transmitted to the cap main body 20 via the guide projection 46, the torque plate 90, and the pressure projection 23b of the body engagement element 23. The cover 40, the torque plate 90, and the cap main body 20 thus integrally rotate counterclockwise. Rotation of the cap main body 20 integrally with the cover 40 by approximately 180 degrees (the state of FIG. 16) causes the male threading element 21 to be released from the leader FNc1 of the female threading element FNc of the filler neck FN. The cap main body 20 is accordingly released from the binding force of the filler neck FN. The fuel cap 10 is then detached from the filler neck FN to open the inlet opening FNb.

(4) Effects of First Embodiment

The structure of the first embodiment achieves the following effects, in addition to those discussed above.

1. In the closing operation of the fuel cap 10, a click sound is given when the click engagement elements 45 of the cover 40 ride over the mating click engagement projections 94c. The user can thus confirm that the fuel cap 10 is clamped with a fixed torque, regardless of the elasticity of the gasket GS.

2. The cantilever springs 93 included in the torque transmission unit 82 are formed integrally with the torque plate 90. This simplified structure does not require any coil spring used in the prior art structure and desirably reduces the required number of parts.

3. The cantilever springs 93 are protruded upright in the substantially vertical direction from the torque plate 90 and are received in the recess 42b of the handle 42. This structure enables the cantilever springs 93 to have a sufficient length in the vertical direction and thereby ensures a high level of elastic deformation.

The engagement of the male threading element 21 with the female threading element FNc requires rotation of the fuel cap 10 by only a small rotational angle of about 180 degrees. This does not require multiple rotating operations and facilitates the attachment procedure.

4. The torque plate 90 is securely positioned between the cover 40 and the cap main body 20 by the combination of the first spring elements 96 and the second spring elements 97 without rattling. This controls a variation in properties between multiple products and ensures stable click sounds and torques.

B. Second Embodiment

Figure 20A:
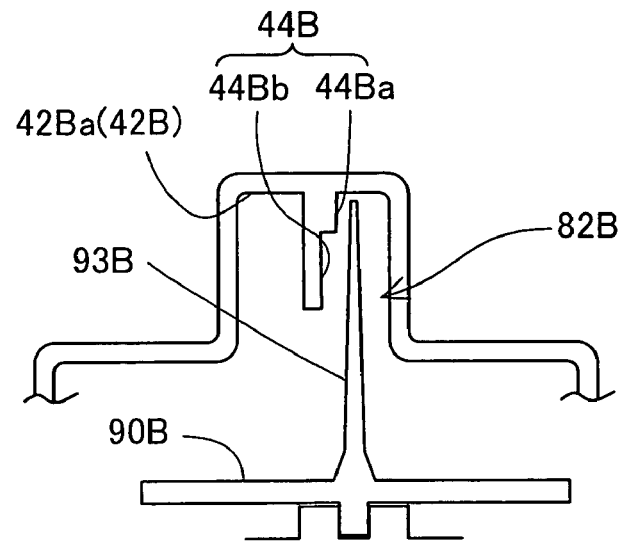
FIGS. 20(A), 20(B) and 20(C) show essential part of a torque transmission unit in a second embodiment of the invention.

FIG. 20 shows essential part of a torque transmission unit in a second embodiment of the invention. The torque transmission unit of the second embodiment is characteristic of the shape of torque transmission ribs 44B to attain a variation in rotational torque in multiple steps. As shown in FIG. 20(A), the torque transmission ribs 44B are protruded from a bottom wall 42Ba of a handle 42B. Each of the torque transmission ribs 44B has a first step 44Ba and a second step 44Bb, which are arranged in vertical steps to come into contact with a cantilever spring 93B. The first step 44Ba and the second step 44Bb form a restriction member to restrict motion of the cantilever spring 93B. The pressing site of the cantilever spring 93B shifts from the first step 44Ba to the second step 44Bb.

In the structure of the second embodiment, in response to rotation of the handle 42B in a closing direction, the first step 44Ba of the torque transmission rib 44B comes into contact with an end of the cantilever spring 93B to deform and incline the cantilever spring 93B. The rotational torque transmitted from the handle 42B to the cap main body increases with an increase in inclined angle of the cantilever spring 93B. A further rotation of the handle 22B causes the second step 44Bb of the torque transmission rib 44B to come into contact with a middle portion of the cantilever spring 93B and deform and incline the cantilever spring 93B.

Figure 20B:
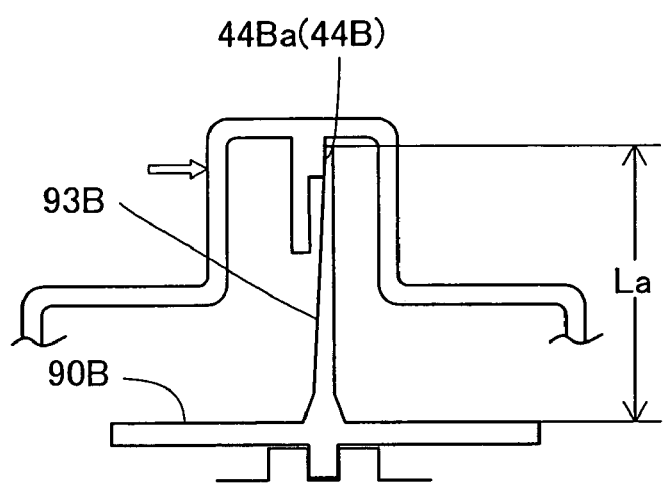
Figure 20C:
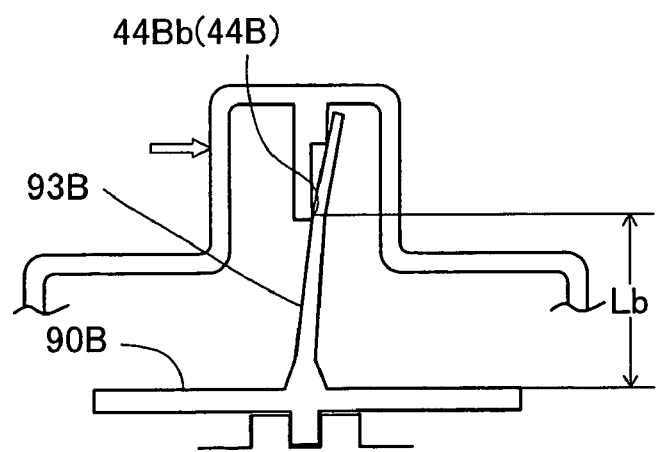
Figure 21:
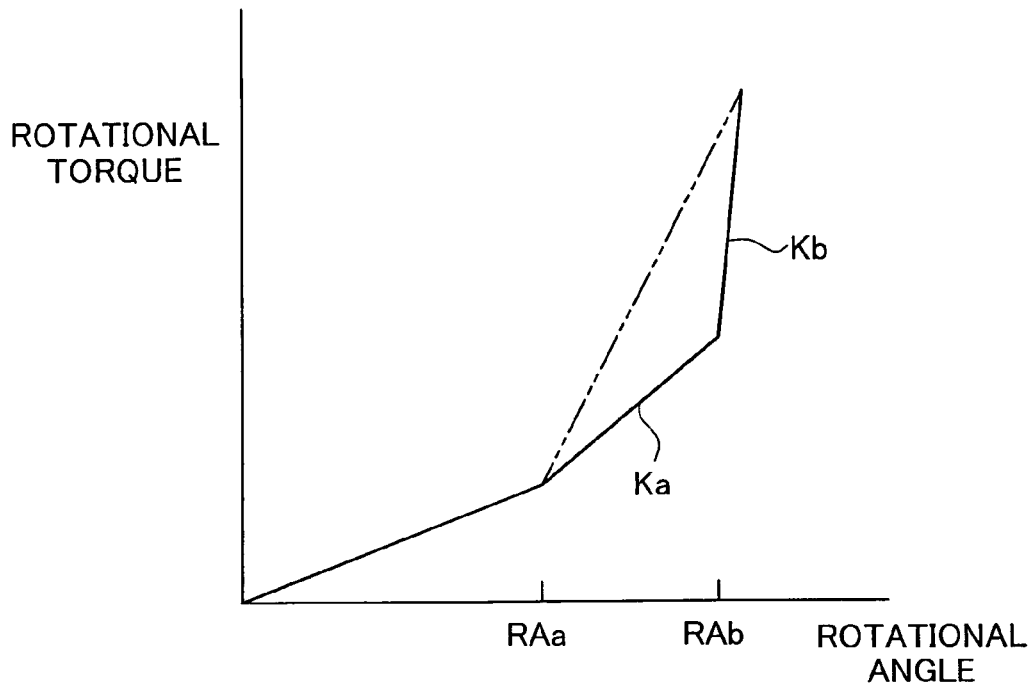
FIG. 21 is a graph showing a variation in rotational torque against rotational angle of a handle.

FIG. 21 is a graph showing a variation in rotational torque plotted against rotational angle of the handle 42B. The abscissa of FIG. 21 represents the rotational angle of the handle 42B, and the ordinate represents the rotational torque. The plot of the solid line represents the measurement result of the second embodiment (see FIG. 20), whereas the plot of the two-dot chain line represents the measurement result of the first embodiment (see FIG. 10). At a preset level RAa of rotational angle, the stopper 21$d$ (see FIG. 3) bumps against the leader FNc1 of the filler neck FN. The state of FIG. 20(B) corresponds to the rotational angle of or over the preset level RAa, and the state of FIG. 20(C) corresponds to the rotational angle of or over another level RAb. As shown in the graph of FIG. 21, the rotational torque increases in proportion to the rotational angle in a range of 0 to the preset level RAa with an increase in compression degree of a gasket. In the structure of the second embodiment (shown by the plot of solid line), at the rotational angle exceeding the preset level RAa, the cantilever spring 93B is pressed against the first step 44Ba. At the rotational angle exceeding the level RAb, the cantilever spring 93B is pressed against the second step 44Bb. The rotational torque rises stepwise at the boundary of the rotational angle between the present level RAa and the level RAb. In the structure of the first embodiment (shown by the plot of the two-dot chain line), on the other hand, the rotational torque abruptly increases with a rise of the rotational angle over the preset level RAa.

In the state of FIG. 20(B) when the first step 44Ba presses and deforms the cantilever spring 93B, the cantilever spring 93B has a spring constant Ka, which depends upon an overall length La of the cantilever spring 93B. In the state of FIG. 20(C) when the second step 44Bb presses and deforms the cantilever spring 93B, on the other hand, the cantilever spring 93B has a spring constant Kb, which depends upon a length Lb between the base of the cantilever spring 93B and the contact position of the second step 44Bb. Here the spring constant Kb is greater than the spring constant Ka.

In the structure of the second embodiment, the rotational torque does not rise abruptly but increases stepwise at the rotational angle of exceeding the preset level RAa. This arrangement effectively prevents the user from incorrectly recognizing completion of a closing operation of the fuel cap at the rotational angle of the preset level RAa. The user can thus naturally continue the closing operation at the rotational angle of exceeding the preset level RAa to hear a click.

C. Third Embodiment

Figure 22:
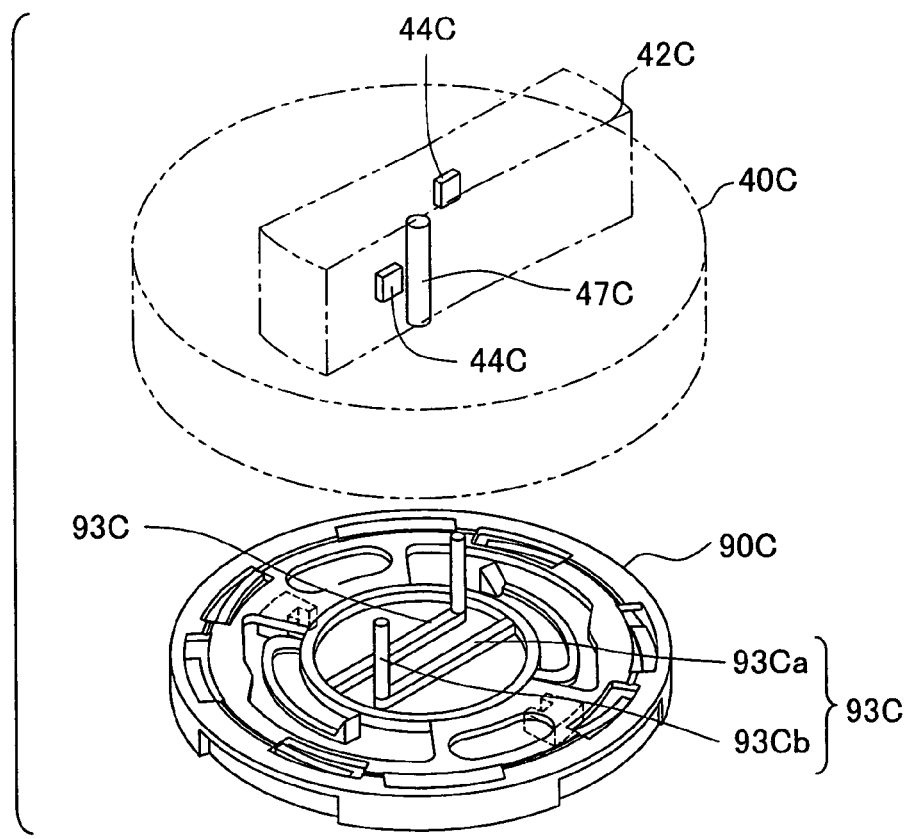
FIG. 22 shows essential part of a torque transmission unit in a third embodiment of the invention.
Figure 23A:
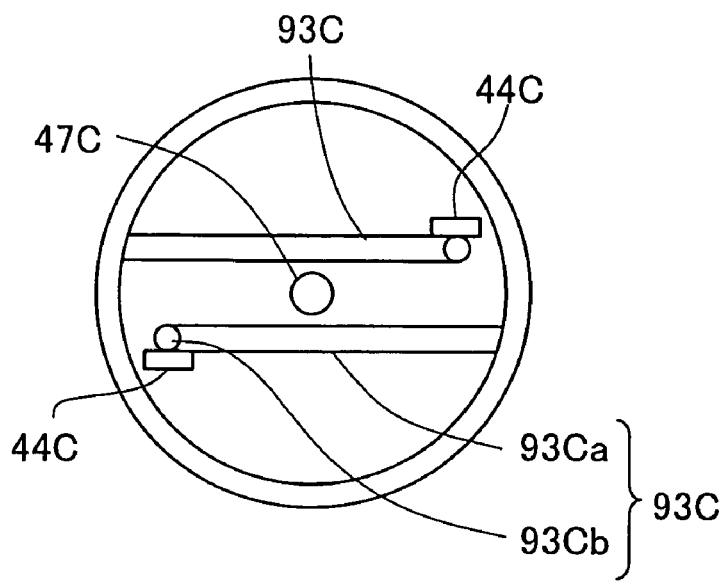
FIGS. 23(A), 23(B) and 23(C) show operations of the torque transmission unit in the third embodiment.

FIG. 22 shows essential part of a torque transmission unit in a third embodiment of the invention. The torque transmission unit of the third embodiment is characteristic of cantilever springs 93C to attain a variation in rotational torque at multiple steps. The cantilever springs 93C are formed in a torque plate 90C as shown in FIG. 22. Each cantilever spring 93C has an arm 93Ca formed as a cantilever and a pressure bar 93Cb protruded in the vertical direction from a free end of the arm 93Ca. A cylindrical support element 47C is formed on a substantial center of the bottom face of a cover 40C. Torque transmission ribs 44C are arranged on both sides of the support element 47C. As shown in the top view of FIG. 23(A), the support element 47C is extended downward to be inserted into a space between the pair of arms 93Ca of the cantilever spring 93C. The torque transmission ribs 44C are designed to press the respective upper ends of the pressure bars 93Cb.

Figure 23B:
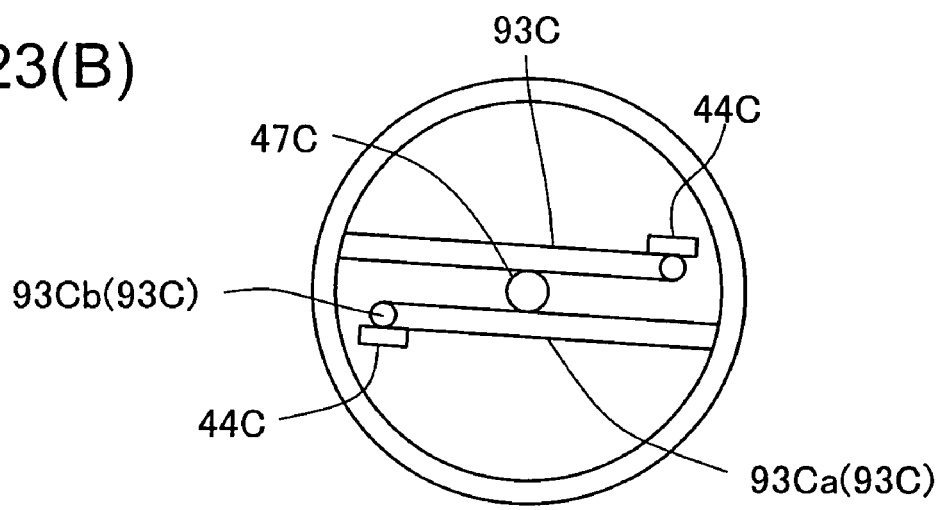
Figure 23C:
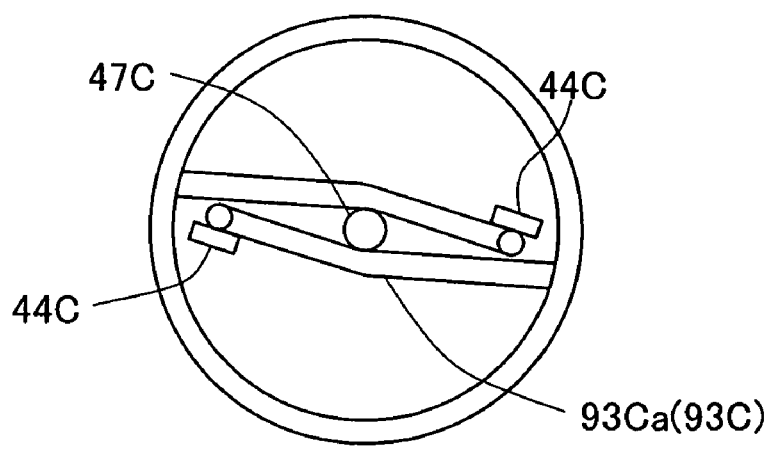

In the structure of the third embodiment, in response to a rotation of a handle 42C in a closing direction, each of the torque transmission ribs 44C presses the end of the pressure bar 93Cb of the cantilever spring 93C in the rotating direction as shown in FIG. 23(B). The arms 93Ca of the cantilever springs 93C are accordingly inclined toward an axial center to come into contact with the support element 47C. A further rotation of the handle 42C causes the support element 47C to come into contact with respective middle portions of the arms 93Ca to bend the arms 93Ca. The spring constant of the cantilever spring 93C depends upon the bending rigidity of the cantilever having the inclined overall length, until the arm 93Ca is bent by the support element 47C. After the arm 93Ca is bent, the spring constant of the cantilever spring 93C is at a higher stage and is determined by the rigidity of bending the arm 93Ca. The cantilever spring 93C accordingly has the similar spring characteristics to those shown in FIG. 21.

D. Fourth Embodiment

Figure 24:
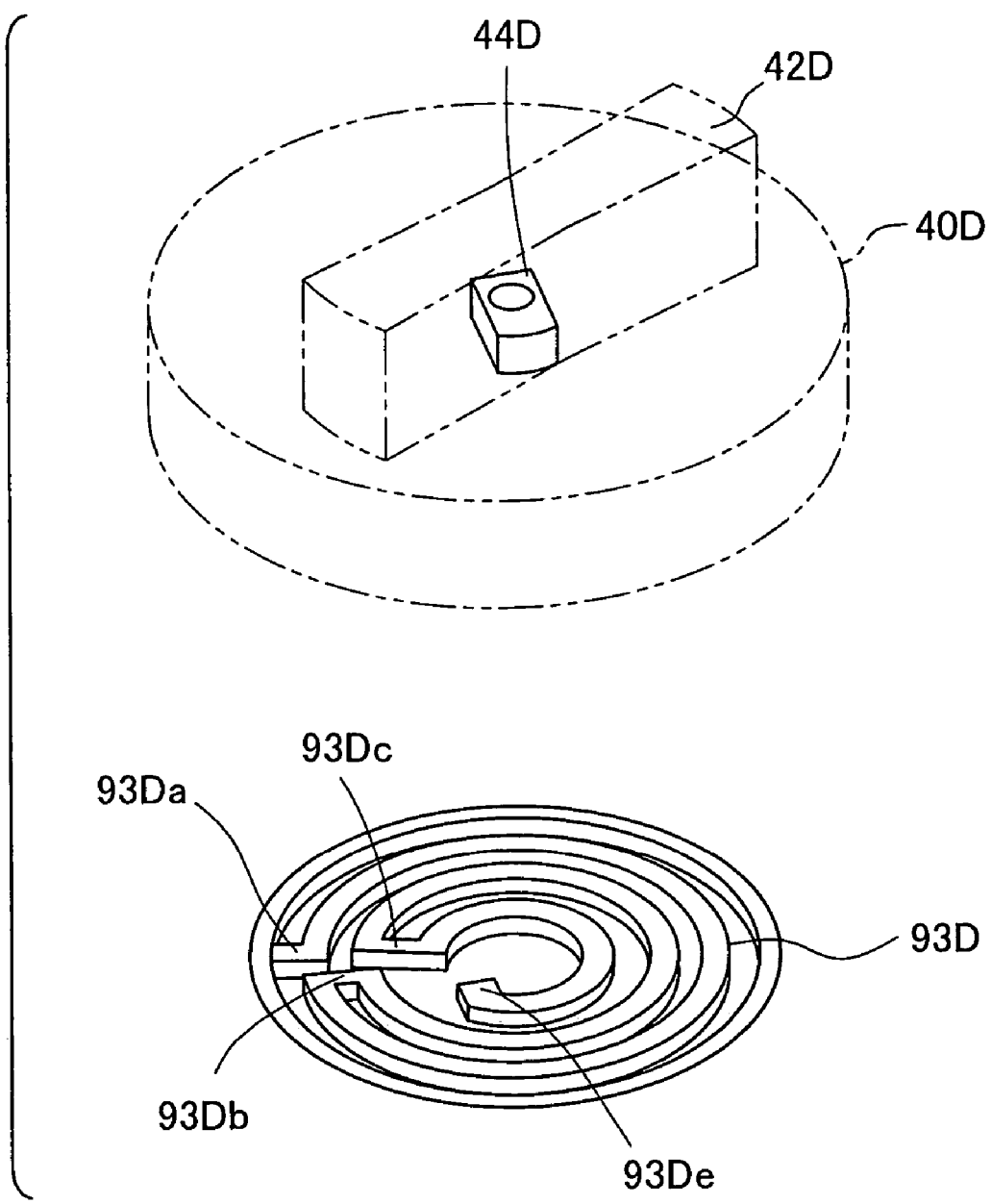
FIG. 24 shows essential part of a torque transmission unit in a fourth embodiment of the invention.
Figure 25A:
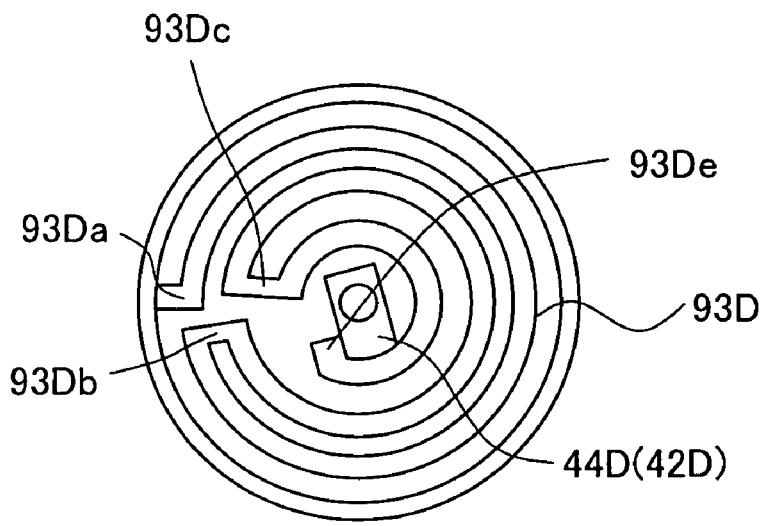
FIGS. 25(A), 25(B) and 25(C) show operations of the torque transmission unit in the fourth embodiment.

FIG. 24 shows essential part of a torque transmission unit in a fourth embodiment of the invention. The torque transmission unit of the fourth embodiment is characteristic of a cantilever spring 93D that is formed in a spiral shape to attain a variation in rotational torque at multiple steps. The cantilever spring 93D is formed in a torque plate. The spiral cantilever spring 93D is folded back at two positions in the periphery of a spring base 93Da, that is, at a first fold 93Db and a second fold 93Dc. A torque transmission rib 44D is formed on a substantial center of the bottom face of a cover 40D. The torque transmission rib 44D presses a terminal end 93De of the cantilever spring 93D to contract the cantilever spring 93D as shown in the top view of FIG. 25(A).

Figure 25B:
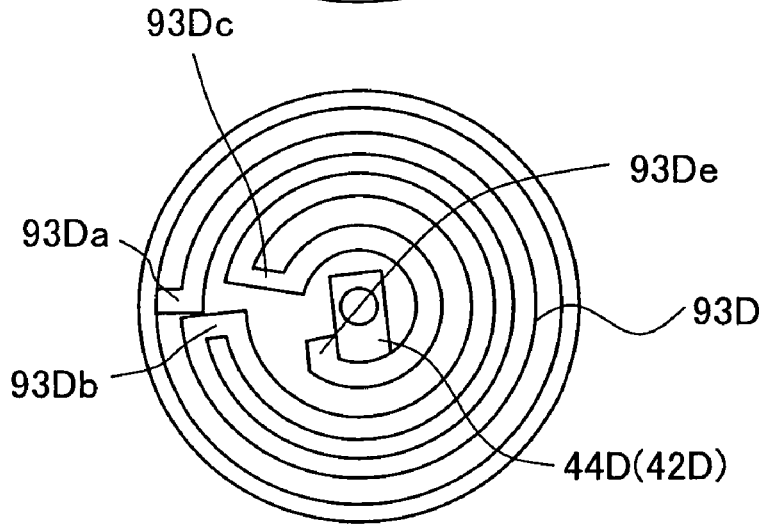
Figure 25C:
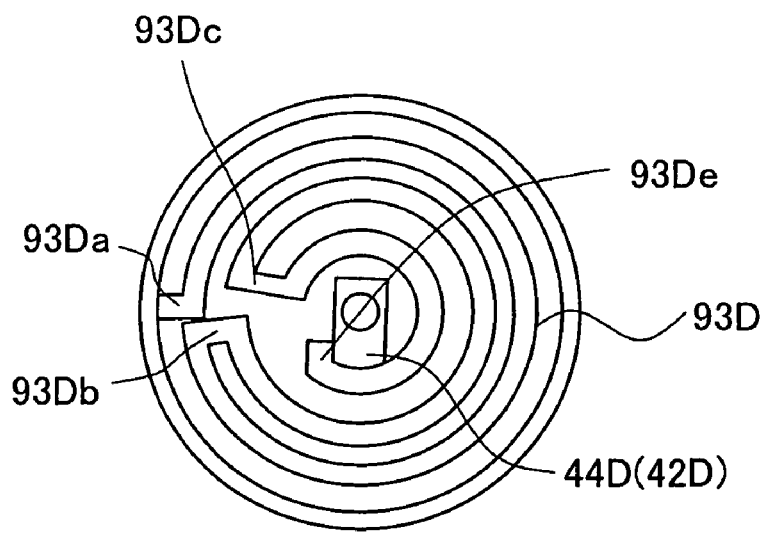

In the structure of the fourth embodiment, in response to a rotation of a handle 42D in a closing direction, the torque transmission rib 44D presses the terminal end 93De of the cantilever spring 93D to elastically deform and contract the cantilever spring 93D as shown in FIG. 25(B). In this state, the spring constant of the cantilever spring 93D depends upon the overall length of the spiral shape of the cantilever spring 93D. When the first fold 93Db comes into contact with the spring base 93Da as shown in FIG. 25(C), the motion of the cantilever spring 93D over the length between the spring base 93Da and the first fold 93Db is restricted. In this state, the spring constant of the cantilever spring 93D is at a higher stage and is determined by the length between the terminal end 93De and the first fold 93Db. The cantilever spring 93D accordingly has the spring characteristics to those shown in FIG. 21.

E. Fifth Embodiment

Figure 26:
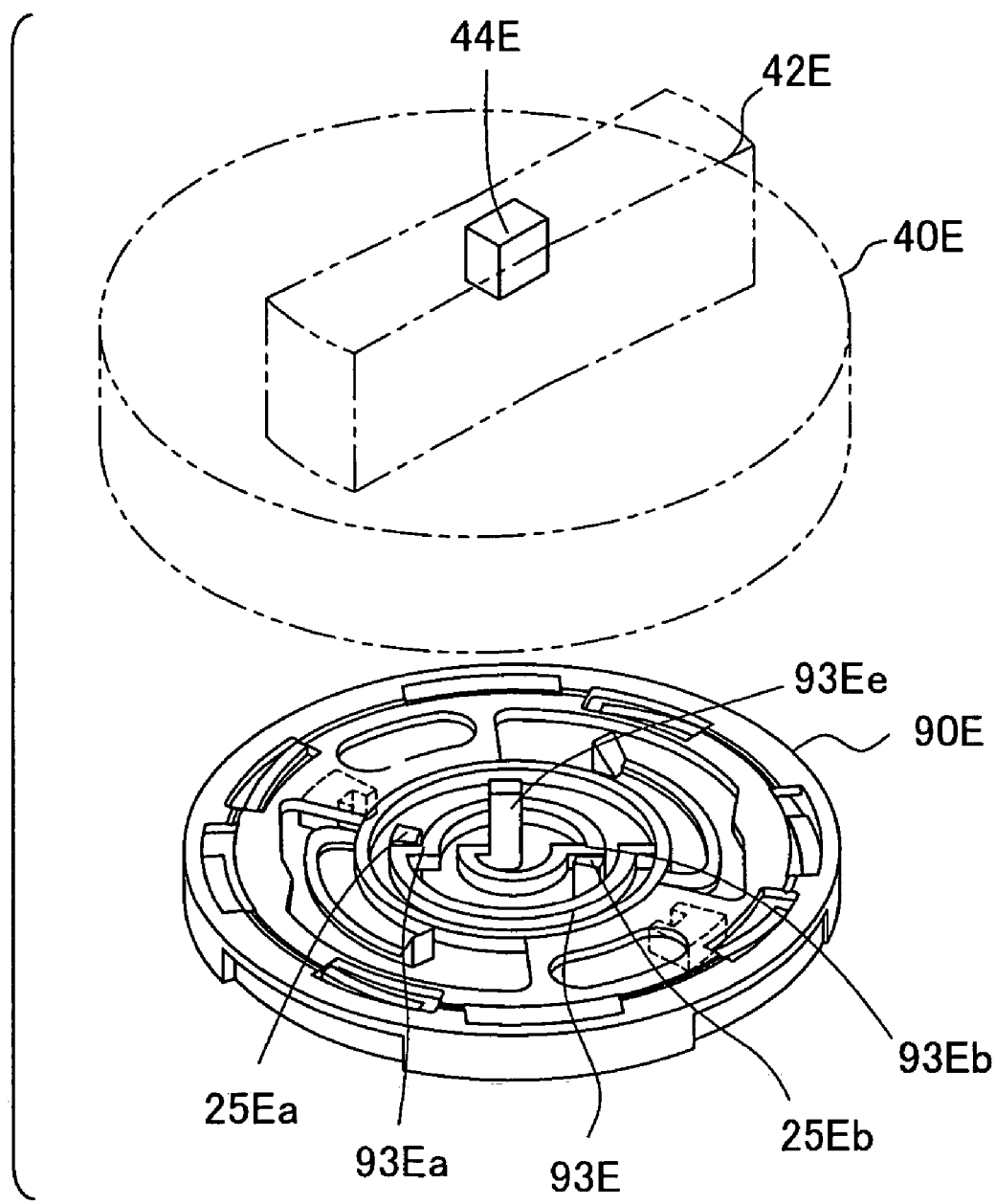
FIG. 26 shows essential part of a torque transmission unit in a fifth embodiment of the invention.

FIG. 26 shows essential part of a torque transmission unit in a fifth embodiment of the invention. The torque transmission unit of the fifth embodiment is characteristic of a cantilever spring 93E that is formed in a spiral shape and has varying spring constant in three stages to attain a variation in rotational torque in multiple steps. The cantilever spring 93E is formed in a torque plate 90E. The spiral cantilever spring 93E has a first bent 93Ea at a position of about 180 degrees and a second bent 93Eb at a position of about 360 degrees from the base. A torque transmission rib 44E is protruded from the bottom face of a cover 40E to be coupled with a terminal end 93Ee of the cantilever spring 93E. Restrictive projections 25Ea and 25Eb formed integrally with a cap main body are located to face the first bent 93Ea and the second bent 93Eb.

In the structure of the fifth embodiment, in response to a rotation of a handle 42E in a closing direction, the torque transmission rib 44E twists the terminal end 93Ee of the cantilever spring 93E to elastically deform and contract the cantilever spring 93E as shown in FIG. 27(A). In this state, the spring constant of the cantilever spring 93E depends upon the overall length of the spiral shape of the cantilever spring 93E. When the first bent 93Ea comes into contact with the facing restrictive projection 25Ea as shown in FIG. 27(B), the motion of the cantilever spring 93E over the length between the base and the first bent 93Ea is restricted. In this state, the spring constant of the cantilever spring 93E is at a higher stage and is determined by the length between the terminal end 93Ee and the first bent 93Ea. When the second bent 93Eb comes into contact with the facing restrictive projection 25Eb as shown in FIG. 27(C), the motion of the cantilever spring 93E over the length between the base and the second bent 93Eb is restricted and the cantilever spring 93E is elastically deformed as shown in FIG. 27(D). In this state, the spring constant of the cantilever spring 93E is at a highest stage and is determined by the length between the terminal end 93Ee and the second bent 93Eb. In this manner, the cantilever spring 93E has the varying spring constant at the three stages.

F. Modifications

The embodiments discussed above are to be considered in all aspects as illustrative and not restrictive. There may be many modifications, changes, and alterations without departing from the scope or spirit of the main characteristics of the present invention. Some examples of possible modification are given below.

1. The above embodiments regard the structure of the fuel cap used for the fuel tank of the automobile. The technique of the invention is also applicable to other caps, for example, caps for a radiator tank.

2. In the embodiment discussed above, the cantilever springs 93 are protruded from the torque plate 90. Flexible springs may alternatively be protruded from the bottom face of the cover 40. In this modified structure, the cover is preferably made of polyacetal to give a sufficiently large spring force.

3. In the embodiment discussed above, the torque mechanism has two click units 84. This number is, however, not restrictive at all, and the torque mechanism may include only one click unit or three or a greater number of click units to ensure desired click sounds.

4. In the embodiments discussed above, the fuel cap applies the torsional force to the gasket in its rotation. The fuel cap may be closed by a vertical operational force, as long as the force is applied in the bending direction (in the direction of the rotational axis).

5. The material of the gasket is not restricted to the fluororubber but may be any other suitable material, for example, elastomer like NBR-PVC.

All changes within the meaning and range of equivalency of the claims are intended to be embraced therein.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A cap device that opens and closes a tank opening and engages with an opening engagement element formed on a periphery of the tank opening, the cap device comprising:

a closer that closes the tank opening with air-tight sealing and has a cap engagement element, which is engaged with the opening engagement element by rotation of the closer by a preset angle;

a handle mechanism that is attached to an upper side of the closer in a rotatable manner to selectively rotate the closer in a closing direction and an opening direction to close and open the tank opening; and a torque mechanism that is provided between the handle mechanism and the closer and selectively transmits a rotational torque in the closing direction and the opening direction to the closer, the torque mechanism including:

a click unit having a first click engagement element and a second click engagement element that mates with the first click engagement element, wherein the first click engagement element and the second click engagement element are disengaged and shift from an initial position to a released position to give a click sound, when the handle mechanism and the closer are rotated relative to each other by the preset angle in response to an operation of the handle mechanism in the closing direction; and a torque transmission unit having a first torque engagement element and a second torque engagement element that mates with the first torque engagement element, wherein the torque transmission unit transmits a rotational torque in the closing direction applied to the handle mechanism to the closer via coupling of the first torque engagement element with the second torque engagement element, wherein the first and second torque engagement elements are different from the first and second click engagement elements, respectively, and at least one of the first torque engagement element and the second torque engagement element is a cantilever spring that is elastically deformed by the rotation of the handle mechanism in the closing direction to transmit the rotational torque to the closer while accumulating a spring force, the cantilever spring being configured to apply the accumulated spring force to restore the click unit from the released position to the initial position when the rotational torque applied to the handle mechanism is released.

2. The cap device in accordance with claim 1, wherein the torque mechanism includes a torque plate that is located between the handle mechanism and the closer, the first torque engagement element is a torque transmission rib formed on the handle mechanism, and the second torque engagement element is a cantilever spring that is protruded from the torque plate in an elastically deformable manner to engage with the torque transmission rib and increase the spring force with an increase in degree of elastic deformation, the cantilever spring being configured to be engaged with the torque transmission rib by rotation of the handle mechanism to be deformed and transmit the rotational torque.

3. The cap device in accordance with claim 2, wherein
the handle mechanism includes a cover that covers an upper portion of the closer, and a handle that is protruded from a top face of the cover to form a recess and has the torque transmission rib formed on an inner wall, and
the cantilever spring is protruded upright in a substantially vertical direction from the torque plate and has an end to be engaged with the torque transmission rib.

4. The cap device in accordance with claim 1, wherein
the torque mechanism includes a torque plate that is located between the handle mechanism and the closer,
the first click engagement element is a click arm that is formed as a cantilever on the torque plate and has a click engagement projection, and
the second click engagement element is a click engagement element formed on the handle mechanism.

5. The cap device in accordance with claim 1, wherein the torque mechanism has a stopper mechanism that stops rotation of the closer to prevent a torque applied to the closer from exceeding a torque limit of closing the tank opening.

6. The cap device in accordance with claim 5, wherein the stopper mechanism includes a stopper protruded from the closer, the stopper being configured to engage with the opening engagement element, thereby stopping rotation of the closer.

7. The cap device in accordance with claim 5, wherein the cantilever spring has a spring constant that increases with an increase in rotational torque applied to the handle mechanism after the stop mechanism works to stop rotation of the closer.

8. The cap device in accordance with claim 7, wherein the torque transmission unit has a restriction member to partially restrict a motion of the cantilever spring, thereby varying the spring constant stepwise.

9. The cap device in accordance with claim 8, wherein the restriction member includes a first step that is formed at a position of pressing the cantilever spring, and a second step that is formed to press the cantilever spring at a position of a greater rotational angle of the handle mechanism than the position of the first step.

10. The cap device in accordance with claim 2, wherein the torque plate is fixed to the closer, and attached to the handle mechanism in a freely rotatable manner.

11. The cap device in accordance with claim 4, wherein the torque plate is fixed to the closer, and attached to the handle mechanism in a freely rotatable manner.

12. A cap device that opens and closes a tank opening and engages with an opening engagement element formed on a periphery of the tank opening, the cap device comprising:
a closer that closes the tank opening with air-tight sealing and has a cap engagement element, which is engaged with the opening engagement element by rotation of the closer by a preset angle;
a handle mechanism that is attached to an upper side of the closer in a rotatable manner to selectively rotate the closer in a closing direction and an opening direction to close and open the tank opening; and
a torque mechanism that is provided between the handle mechanism and the closer and selectively transmits a rotational torque in the closing direction and the opening direction to the closer,
wherein the torque mechanism includes:
a torque plate that is located between the handle mechanism and the closer;
a click unit having a first click engagement element and a second click engagement element that mates with the first click engagement element, wherein the first click engagement element is a click arm that is formed as a cantilever on the torque plate and has a click engagement projection, and the second click engagement element is a click engagement element formed on the handle mechanism, the first click engagement element and the second click engagement element are disengaged and shift from an initial position to a released position to give a click sound, when the handle mechanism and the closer are rotated relative to each other by the preset angle in response to an operation of the handle mechanism in the closing direction; and
a torque transmission unit having a first torque engagement element and a second torque engagement element that mates with the first torque engagement element, wherein the torque transmission unit transmits a rotational torque in the closing direction applied to the handle mechanism to the closer via coupling of the first torque engagement element with the second torque engagement element, wherein the first torque engagement element is a torque transmission rib formed on the handle mechanism, and the second torque engagement element is a cantilever spring that is protruded from the torque plate in an elastically deformable manner to engage with the torque transmission rib and increase the spring force with an increase in degree of elastic deformation, wherein the cantilever spring is configured to apply the accumulated spring force to restore the click unit from the released position to the initial position when the rotational torque applied to the handle mechanism is released.

13. The cap device in accordance with claim 12, wherein the handle mechanism includes a cover that covers an upper portion of the closer, and a handle that is protruded from a top face of the cover to form a recess and has the torque transmission rib formed on an inner wall, and
the cantilever spring is protruded upright in a substantially vertical direction from the torque plate and has an end to be engaged with the torque transmission rib.

14. The cap device in accordance with claim 12, wherein the torque mechanism has a stopper mechanism that stops rotation of the closer to prevent a torque applied to the closer from exceeding a torque limit of closing the tank opening.

15. The cap device in accordance wit claim 14, wherein the stopper mechanism includes a stopper protruded from the closer, the stopper being configured to engage with the opening engagement element, thereby stopping rotation of the closer.

16. The cap device in accordance with claim 14, wherein the cantilever spring has a spring constant that increases with an increase in rotational torque applied to the handle mechanism after the stop mechanism works to stop rotation of the closer.

17. The cap device in accordance with claim 16, wherein the torque transmission unit has a restriction member to partially restrict a motion of the cantilever spring, thereby varying the spring constant stepwise.

18. The cap device in accordance with claim 17, wherein the restriction member includes a first step that is formed at a position of pressing the cantilever spring, and a second step that is formed to press the cantilever spring at a position of a greater rotational angle of the handle mechanism than the position of the first step.

19. The cap device in accordance with claim 1, wherein the torque plate is fixed to the closer, and attached to the handle mechanism in a freely rotatable manner.

* * * * *